US012555440B2

(12) United States Patent

Maya

(10) Patent No.: US 12,555,440 B2

(45) Date of Patent: Feb. 17, 2026

(54) ACCUMULATING TRACKABLE ELEMENTS FOR AWARDS

(71) Applicant: IGT, Las Vegas, NV (US)

(72) Inventor: Darren Maya, Reno, NV (US)

(73) Assignee: IGT, Las Vegas, NV (US)

( * ) Notice: Subject to any disclaimer, the term of this patent is extended or adjusted under 35 U.S.C. 154(b) by 539 days.

(21) Appl. No.: 17/592,163

(22) Filed: Feb. 3, 2022

(65) Prior Publication Data

US 2023/0245529 A1 Aug. 3, 2023

(51) Int. Cl.
*G07F 17/32* (2006.01)

(52) U.S. Cl.
CPC ...... *G07F 17/3267* (2013.01); *G07F 17/3211* (2013.01); *G07F 17/3258* (2013.01); *G07F 17/3293* (2013.01)

(58) Field of Classification Search
CPC ............. G07F 17/3267; G07F 17/3211; G07F 17/3258; G07F 17/3293
See application file for complete search history.

(56) References Cited

U.S. PATENT DOCUMENTS 8,070,597 B2 12/2011 Cuddy
8,435,111 B2 5/2013 Filipour et al.
9,214,065 B2 12/2015 Baerlocher
10,388,108 B2 8/2019 Cuddy et al.
10,510,211 B2 12/2019 Morin
10,546,452 B2 1/2020 Kennedy et al.
10,755,529 B2 8/2020 Brown et al.
10,769,882 B2 9/2020 Uss et al.
10,867,477 B2 12/2020 Graham et al.
11,954,980 B2 * 4/2024 Berman .............. G07F 17/3262
2008/0039191 A1 * 2/2008 Cuddy .................... G07F 17/32 463/25
2010/0105454 A1 * 4/2010 Weber ..................... H04L 67/53 463/1
2010/0120498 A1 * 5/2010 Cuddy ............... G07F 17/3255 463/20
2011/0039610 A1 * 2/2011 Baerlocher ......... G07F 17/3293 463/43
2014/0004932 A1 1/2014 Baerlocher
2014/0179387 A1 * 6/2014 Lark .................. G07F 17/3244 463/13
2015/0379823 A1 * 12/2015 Brown ............... G07F 17/3293 463/11
2018/0089949 A1 * 3/2018 Moody ............... G07F 17/3258
2018/0276947 A1 9/2018 Laduca et al.
2018/0353846 A1 * 12/2018 Nowak .............. G07F 17/3262
2019/0099661 A1 4/2019 Laduca et al.
2020/0226883 A1 7/2020 Gerchak

* cited by examiner

*Primary Examiner* — Jeffrey K Wong
(74) *Attorney, Agent, or Firm* — Neal, Gerber & Eisenberg LLP

(57) ABSTRACT

Gaming systems and methods that accumulate zero, one or more trackable elements responsive to zero, one or more game outcomes and trigger a secondary event responsive to a quantity of accumulated trackable elements reaching a threshold quantity.

19 Claims, 17 Drawing Sheets

ACCUMULATING TRACKABLE ELEMENTS FOR AWARDS

BACKGROUND

In various embodiments, the systems and methods of the present disclosure utilize trackable elements accumulated in association with game outcomes to activate a secondary event.

Gaming machines may provide players awards in primary games. Gaming machines generally require the player to place or make a wager to activate the primary or base game. The award may be based on the player obtaining a winning symbol or symbol combination and on the amount of the wager.

BRIEF SUMMARY

In certain embodiments, the present disclosure relates to a gaming system including a processor, and a memory device that stores a plurality of instructions. When executed by the processor in association with a play of a card game, the instructions cause the processor to determine a card game outcome, and cause a display, by a display device, of the card game outcome. When executed by the processor responsive to the card game outcome being associated with an occurrence of a point accumulation event, the instructions cause the processor to determine a quantity of points, and accumulate the quantity of points. When executed by the processor responsive to the accumulated quantity of points causing a total quantity of accumulated points to reach a threshold quantity of points, the instructions cause the processor to trigger a secondary event associated with an opportunity to win a progressive award maintained independent of any accumulation of any points.

In certain embodiments, the present disclosure relates to a gaming system including a processor, and a memory device that stores a plurality of instructions. When executed by the processor responsive to a secondary event being triggered in association with a play of a card game comprising a first quantity of hands of playing cards, the instructions cause the processor to cause a display, by a display device, of a first quantity of selection groups (wherein each selection group comprises a plurality of selections and the first quantity of selection groups corresponds to the first quantity of hands of playing cards), receive a pick of a selection group of the first quantity of selection groups, and for each of the plurality of selections of the picked selection group, cause a display, by the display device, of an award associated with that selection. When executed by the processor responsive to the secondary event being triggered in association with the play of the card game comprising a second, different quantity of hands of playing cards, the instructions cause the processor to cause a display, by the display device, of a second, different quantity of selection groups (wherein each selection group comprises the plurality of selections and the second, different quantity of selection groups corresponds to the second, different quantity of hands of playing cards), receive a pick of a selection group of the second, different quantity of selection groups, and for each of the plurality of selections of the picked selection group, cause a display, by the display device, of an award associated with that selection.

In certain embodiments, the present disclosure relates to a gaming system including a processor, and a memory device that stores a plurality of instructions. When executed by the processor responsive to a first secondary event being triggered in association with a play of a first card game comprising a first quantity of hands of playing cards, the instructions cause the processor to determine, based on the first quantity of hands of playing cards, a first quantity of picks of a plurality of selection groups, wherein each pick results in a plurality of awards associated with a plurality of selections of the picked selection group being displayed by a display device. When executed by the processor responsive to a second secondary event being triggered in association with a play of a second card game comprising a second, different quantity of hands of playing cards, the instructions cause the processor to determine, based on the second, different quantity of hands of playing cards, a second, different quantity of picks of the plurality of selection groups.

Additional features are described herein, and will be apparent from the following Detailed Description and the figures.

DETAILED DESCRIPTION

Figure 1:
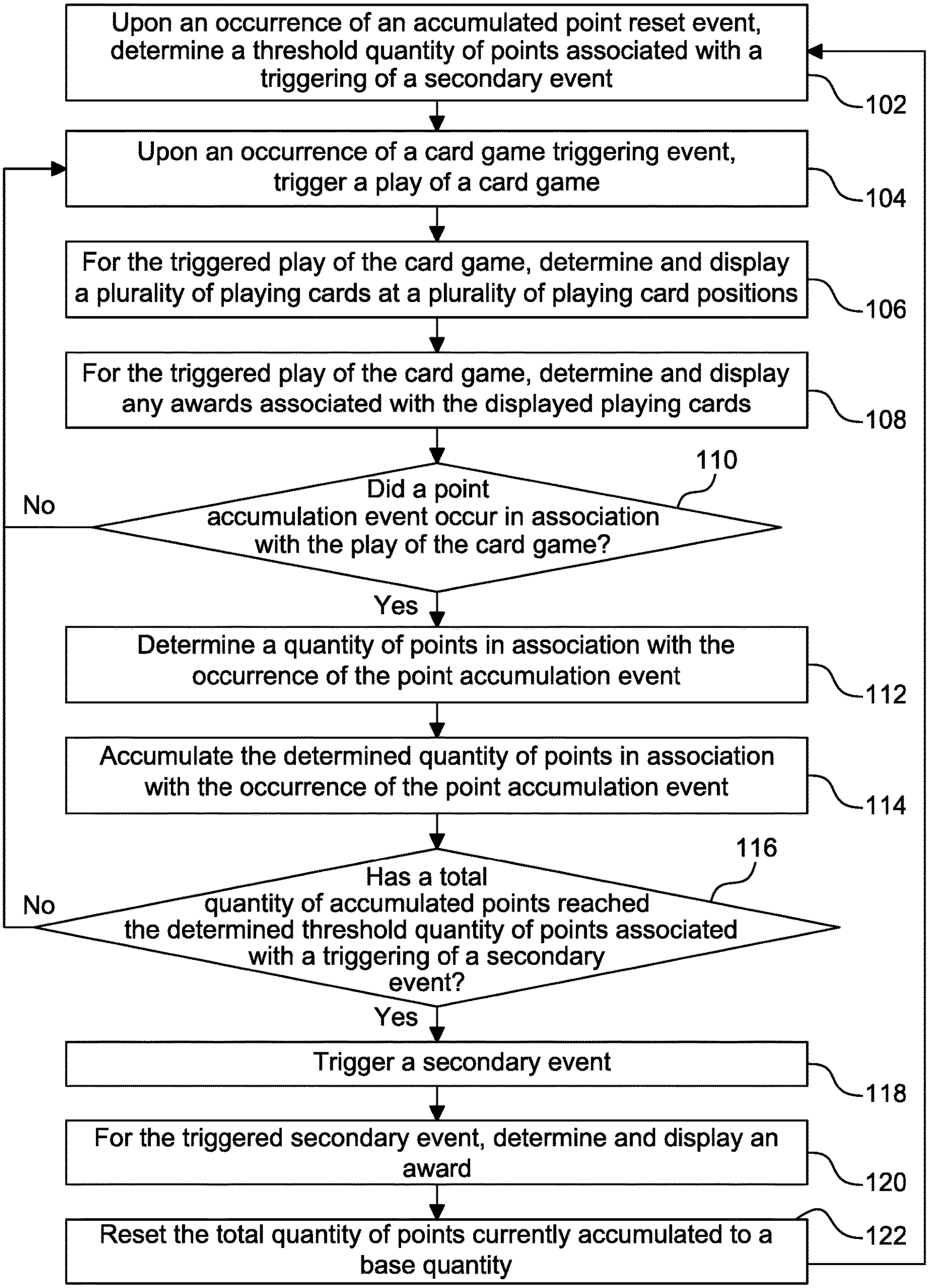
FIG. 1 is a flow chart an example process for operating a gaming system that accumulates points and triggers a secondary event based on the accumulated points

In various embodiments, the present disclosure relates generally to gaming systems and methods that accumulate zero, one or more trackable elements responsive to zero, one or more game outcomes and trigger a secondary event responsive to a quantity of accumulated trackable elements reaching a threshold quantity.

In certain embodiments, for a play of a card game, the gaming system determines and displays a game outcome as well as any award associated with the game outcome. The gaming system additionally accumulates zero, one or more trackable elements, such as points, associated with the determined game outcome. For example, for each hand of a single hand poker game or a multiple hand poker game (wherein any held cards from a primary poker hand are duplicated into all of the secondary poker hands overlappingly played), the gaming system determines and displays a game outcome and displays an accumulation of any points associated with that displayed game outcome. In these embodiments, the accumulated trackable elements persist over multiple plays of multiple games (and even, in certain instances, over multiple gaming sessions undertaken by different users) such that a game outcome of one play of a card game factors into zero, one or more events that occur in association with a subsequent play of the card game by the same user or even a different user. Moreover, since different game outcomes are associated with different quantities of trackable elements accumulated, the randomness of which game outcomes are determined during a first period of time factors into the probability of one or more events occurring during a second, subsequent period of time.

In addition to accumulating zero, one or more trackable elements, such as points, associated with the determined game outcome, the gaming system determines if any accumulated trackable elements caused a total quantity of accumulated trackable elements to reach a threshold quantity of trackable elements, such as a randomly determined threshold quantity of points. That is, the gaming system tracks a total quantity of accumulated trackable elements relative to a threshold quantity of trackable elements (which is not displayed) such that the user of the gaming system is unaware of when a modification of a current operation of the gaming system (e.g., a triggering of a secondary event that would not otherwise occur) will be realized based on the occurrences of past events.

If the gaming system determines that any accumulated trackable elements did not cause the total quantity of accumulated trackable elements to reach the threshold quantity of trackable elements, the gaming system enables another play of the card game including another opportunity to accumulate one or more trackable elements. In these embodiments, any trackable elements accumulated in association with the current play of the card game persist for subsequent use in association with a future play of the card game. In other words, while one or more trackable elements accumulated in association with a current play of the card game may not cause a triggering of a secondary event, such trackable elements are retained for a subsequent determination of whether to cause a triggering of a secondary event.

On the other hand, if the gaming system determines that any accumulated trackable elements caused the total quantity of accumulated trackable elements to reach the threshold quantity of trackable elements, the gaming system triggers a secondary event and resets the total quantity of accumulated trackable elements to a base or reset quantity. In certain embodiments, for the triggered secondary event, the gaming system displays a plurality of groups of selections and enables a user to pick a group of selections from the plurality of groups of selections. For example, if the play of the game includes a multiple hand poker game, the gaming system displays a plurality hands of cards and enables the user to pick one of the plurality of hands of cards. In this example, rather than a user individually picking each selection from the universe of available selections, the user makes a single input that accounts for multiple selections of the picked group. Such a configuration represents an improved interface whereby less inputs are required by the user to achieve a comparable result.

Following the user picking a group of selections, the gaming system displays an award associated with each selection of the picked group of selections. In different embodiments, such awards include static value awards and/or variable value awards (e.g., a progressive award of a maintained multi-level progressive award configuration). The employment of such variable valued awards provides that the gaming system of the present disclosure utilizes the accumulation of trackable elements, such as points, associated with game outcomes of plays of card games to potentially trigger an event associated with an opportunity to win an award utilizing the accumulation of wagers placed on such plays of the card games (i.e., a progressive award).

While certain embodiments described below are directed to accumulating trackable elements, such as points, to potentially trigger a secondary event in association with one or more plays of a primary game, such as a primary card game, it should be appreciated that such embodiments may additionally or alternatively be employed in association with accumulating trackable elements, such as points, to potentially trigger a secondary event in association with one or more plays of a secondary game, such as a bonus game. Moreover, while certain embodiments described below are directed to accumulating trackable elements, such as points, to potentially trigger a secondary event, it should be appreciated that such embodiments may alternatively be employed via reducing a quantity of trackable elements, such as points, to potentially trigger a secondary event. Furthermore, while certain embodiments described below are directed to accumulating trackable elements to potentially trigger a secondary event in association with a card game, it should be appreciated that such embodiments may additionally or alternatively be employed in association with accumulating points to potentially trigger a secondary event in association with non-card games, such as, but not limited to, reel games, keno games, and bingo games.

Moreover, while certain embodiments described below are directed to the gaming system accumulating trackable elements, such as points, to potentially trigger a secondary event that is displayed by an electronic gaming machine ("EGM") such as a slot machine, a video poker machine, a video lottery terminal, a terminal associated with an electronic table game, a terminal associated with a live table game, a video keno machine, a video bingo machine and/or a sports betting terminal that also offers sports betting opportunities, it should be appreciated that such embodiments may additionally or alternatively be employed in association with the gaming system accumulating trackable elements to potentially trigger a secondary event that is displayed by a personal gaming device, such as desktop computers, laptop computers, tablet computers or computing devices, personal digital assistants, mobile phones, and other mobile computing devices that offer plays of wagering games (and in certain instances, sports betting opportunities). Furthermore, while a credit balance, a wager, and any awards are displayed as an amount of monetary credits or currency, in certain of the embodiments described below, one or more of such credit balance, such wager, and any awards provided to such a player may be for non-monetary credits, promotional credits, and/or player tracking points or credits.

FIG. 1 is a flowchart of an example process or method of operating the gaming system of the present disclosure. In various embodiments, the process is represented by a set of instructions stored in one or more memories and executed by one or more processors. Although the process is described with reference to the flowchart shown in FIG. 1, many other processes of performing the acts associated with this illustrated process may be employed. For example, the order of certain of the illustrated blocks or diamonds may be changed, certain of the illustrated blocks or diamonds may be optional, or certain of the illustrated blocks or diamonds may not be employed.

In various embodiments, upon an occurrence of an accumulated point reset event, the gaming system determines a threshold quantity of points associated with a triggering of a secondary event as indicated in block 102. In certain embodiments, an accumulated point reset event occurs upon an initiation of the gaming system, such as following the gaming system powering up or otherwise being reset. In certain embodiments, an accumulated point reset event occurs upon the initiation of a gaming session, such as upon the gaming system moving from an idle state to an active state. In certain embodiments, an accumulated point reset event occurs following an occurrence of a secondary event. It should be appreciated that the higher the determined threshold quantity of points, the longer, on average, between triggers of the secondary event (and conversely the lower the determined threshold quantity of points, the shorter, on average, between triggers of the secondary event). As such, the determination of the threshold quantity of points represents at least a partial determination of the volatility of the gaming system.

In certain embodiments, in instances that one or more variable value awards are available for a triggered secondary event, the gaming system additionally maintains a plurality of progressive awards. In certain embodiments, the plurality of progressive awards are maintained in a multi-level progressive award configuration ("MLP") associated with a single EGM. In certain embodiments, the progressive awards are maintained in an MLP configuration associated with a plurality of EGMs. In different embodiments wherein the progressive awards are associated with a plurality of EGMs, the EGMs may be in the same bank of EGMs or in the same gaming establishment (such that the progressive award may be considered a local area progressive ("LAP")) or in (or otherwise associated with) two or more different gaming establishments (such that the progressive award may be considered a wide area progressive ("WAP")).

In certain embodiments, upon an occurrence of a progressive award increment event, the gaming system increases one or more of the maintained progressive awards. In one such embodiment, the progressive award increment event occurs based on (or as a result of) a wager being placed on a play of a game at an EGM associated with that progressive award. In this embodiment, the increase of the maintained progressive award is funded by a portion of the wager placed (e.g., 2% of the amount of wager placed is allocated to growing the progressive award). In another such embodiment, the progressive award increment event additionally or alternatively occurs based on (or as a result of) a side wager being placed at an EGM associated with that progressive award. In this embodiment, the increase of the maintained progressive award is funded by part or all of the side wager placed (e.g., 50% of the amount of side wager placed is allocated to growing the progressive award). In certain embodiments, each of the progressive awards maintained by the gaming system have the same contribution rate (i.e., the portion of the wager placed allocated to the progressive award) and/or the same progressive award reset value (which is the value the progressive award is reset to after being provided). In certain embodiments, a plurality of the progressive awards maintained by the gaming system have different contribution rates and/or different progressive award reset values. In another such embodiment, the progressive award increment event additionally or alternatively occurs based on (or as a result of) one or more displayed events occurring in association with one or more plays of one or more games. In another such embodiment, the progressive award increment event occurs independent of any displayed events associated with any plays of any games.

Following the determination of a threshold quantity of points and, in certain embodiments, in addition to maintaining and periodically increasing one or more values of one or more progressive awards, upon an occurrence of a card game triggering event, the gaming system triggers a play of a card game as indicated in block 104. In certain embodiments wherein the card game is provided as a primary game, the card game triggering event occurs upon a placement of a wager. In certain embodiments wherein the card game is provided as a secondary game, the card game triggering event occurs based on a displayed event associated with a play of a primary game. In another embodiment wherein the card game is provided as a secondary game, the card game triggering event occurs based on an event independent of any displayed event associated with the play of the primary game.

For the triggered play of the card game, the gaming system determines and displays a plurality of playing cards at a plurality of playing card positions as indicated in block 106. After determining and displaying the plurality of playing cards for the play of the card game (which may or may not include providing the user the option to discard one or more playing cards and draw any replacement playing cards), the gaming system determines and displays any awards associated with the displayed playing cards for the play of the card game as indicated in block 110. In these embodiments, the gaming system determines an displays an outcome and any associated award for the triggered play of the card game.

Figure 2A:
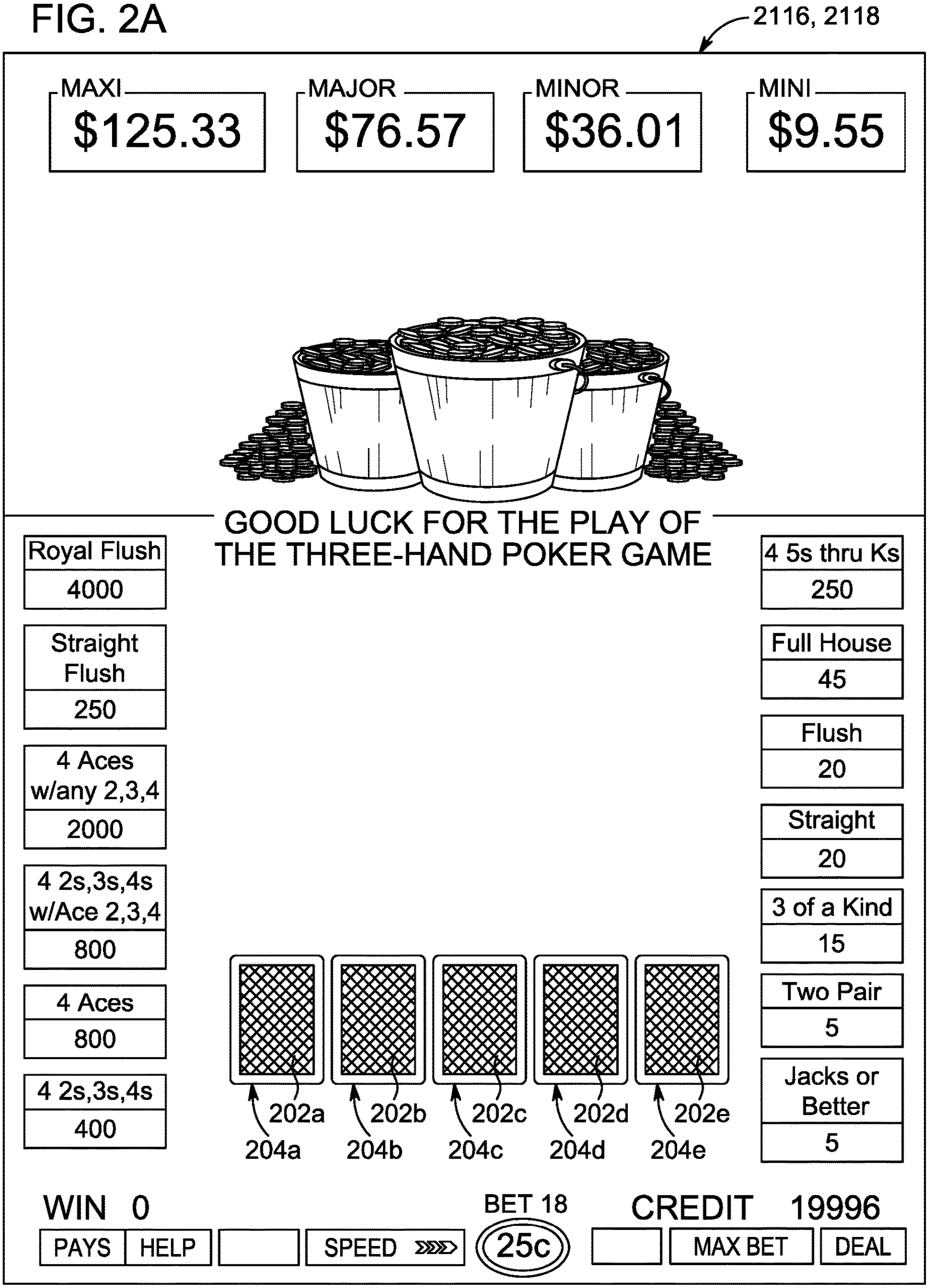
FIGS. 2A, 2B, 2C, 2D, 2E, 2F, 2G, 2H, 2I, 2J, 2K, and 2L are front views of one embodiment of the gaming system of the present disclosure illustrating a plurality of plays of a card game associated with an accumulation of points to potentially trigger a secondary event and the subsequent triggering of the secondary event.

In certain embodiments wherein the card game includes a multiple hand poker game, the gaming system randomly determines a plurality of playing cards dealt from a deck of playing cards, such as the fifty-two suited and ranked playing cards from a deck of fifty-two playing cards. In these embodiments, the gaming system displays the randomly determined playing cards at a plurality of playing card positions. For example, as seen in FIG. 2A, the gaming system randomly determines and displays an initial primary hand of playing cards including zero, one or more playing cards 202*a* to 202*e* displayed at zero, one or more playing card positions 204*a* to 204*e*.

Figure 2B:
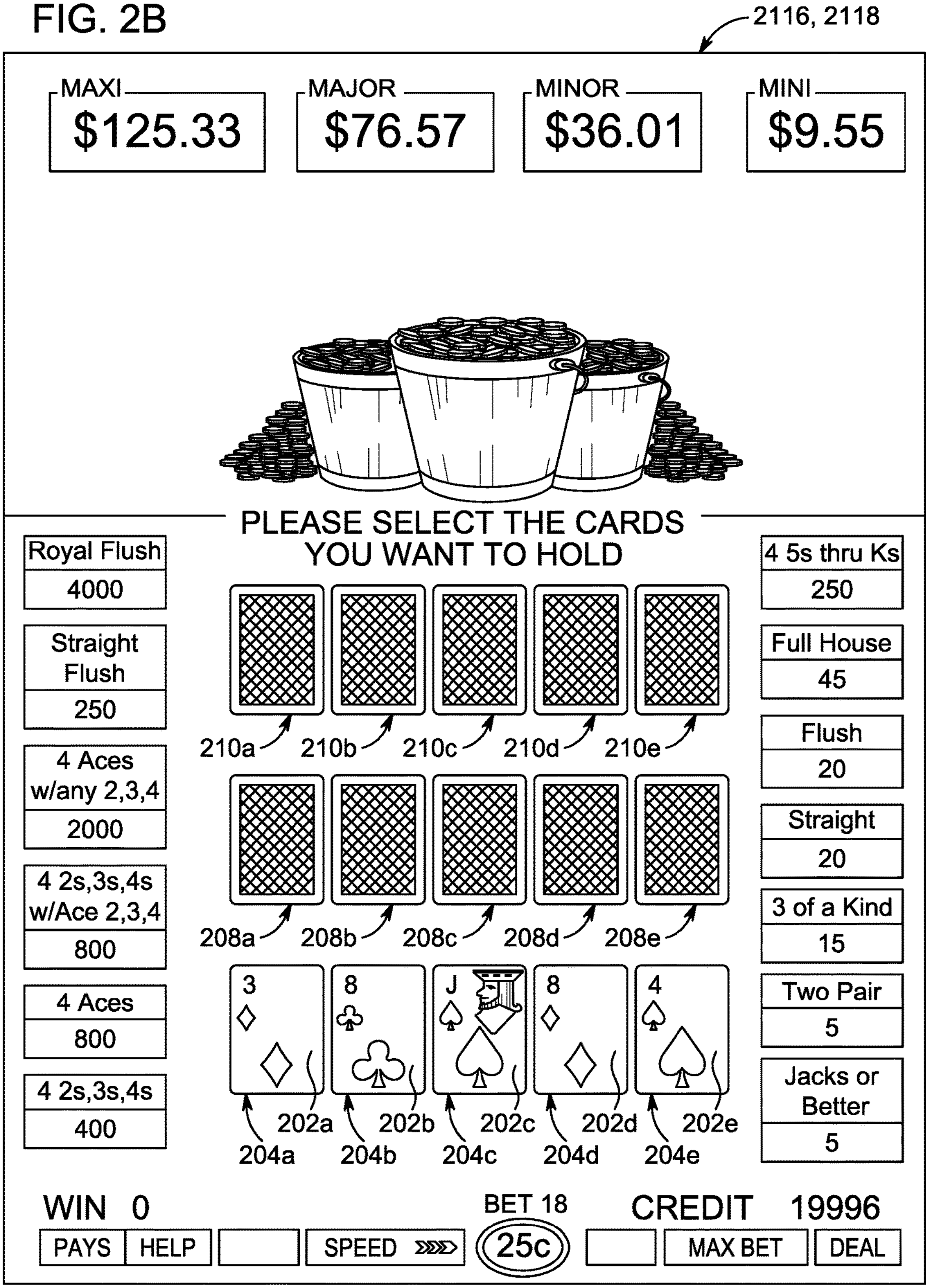
Figure 2C:
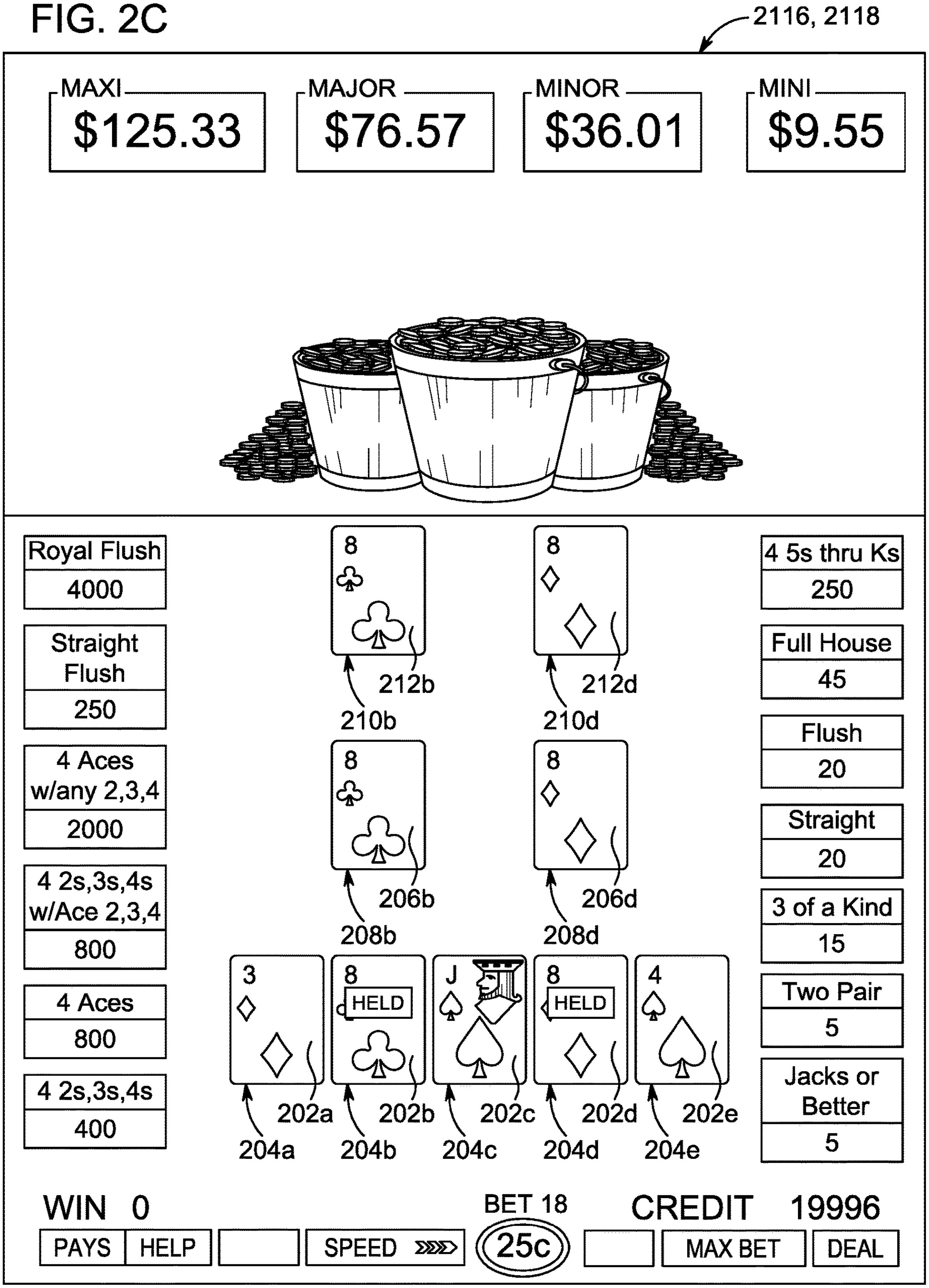

In these embodiments wherein the card game includes a multiple hand poker game, following the display of the initial primary hand of playing cards formed from the displayed playing cards, the gaming system enables the user to choose none, one, a plurality, or all of the displayed playing cards to hold, wherein the gaming system duplicates each playing card that is held into the other hands of playing cards being played. For example, as seen in FIGS. 2B and 2C, following the user selecting to hold each of the eight of clubs playing card 202*b* displayed at playing card position 204*b* and the eight of diamonds playing card 202*d* displayed at playing card position 204*d*, the gaming system duplicated the held playing cards into each of the two secondary hands also being played. In this example, the duplication resulted in the gaming system displaying an eight of clubs playing card 206*b* displayed at playing card position 208*b*, and an eight of diamond playing card 206*d* displayed at playing card position 208*d* of a first secondary hand being played and an eight of clubs playing card 212*b* displayed at playing card position 210*b* and an eight of diamonds playing card 212*d* displayed at playing card position 210*d* of a second secondary hand being played.

Figure 2D:
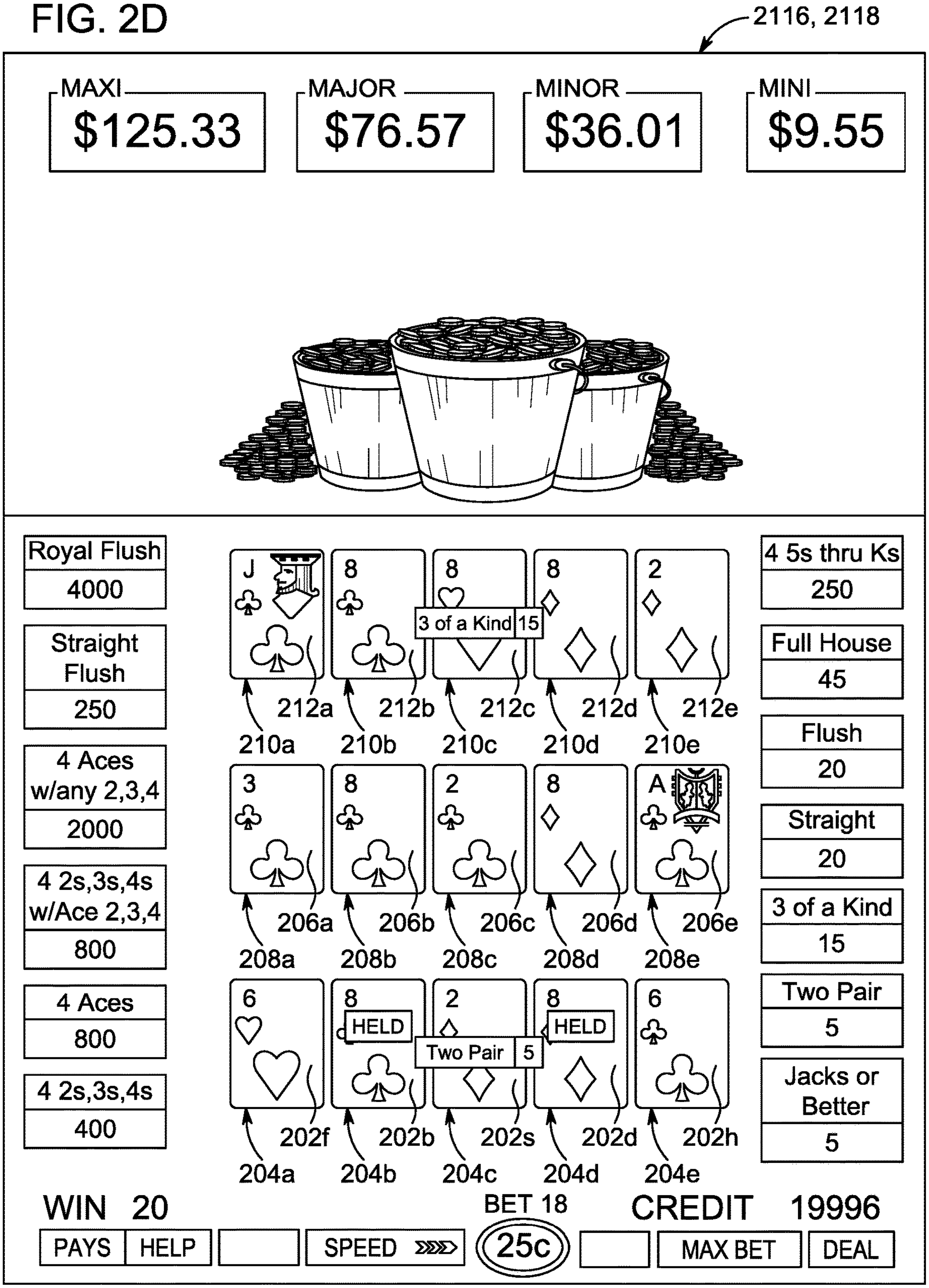

In these embodiments wherein the card game includes a multiple hand poker game, following the holding and duplication of zero, one or more playing cards, the gaming system discards the non-held playing cards and randomly determines and displays replacement cards for the unheld cards to complete each of the hands of playing cards. For example, as seen in FIG. 2D, following the user's decision to hold the two playing cards 202*b* and 202*d*, the gaming system discards the non-held three of diamonds playing card 202*a* at playing card position 204*a* of the primary hand, the non-held jack of spades playing card 202*c* at playing card position 204*c* of the primary hand, and the non-held four of spades playing card 202*e* at playing card position 204*e* of the primary hand. The gaming system then randomly determines and displays replacement playing cards 202*f*, 202*g* and 202*h* at playing card positions 204*a*, 204*c* and 204*e*, respectively, to complete the primary hand. As further seen in FIG. 2D, for the playing card position of each secondary hand corresponding to the playing card position of a discarded playing card from the primary hand, the gaming system randomly determines and displays a playing card, from a separate deck, at that playing card position to complete each secondary hand. After a completion of each of the played poker hands of the multiple hand poker game, the gaming system determines a poker hand ranking of each complete poker hand and displays a corresponding award for each winning poker hand. As seen in FIG. 2D, since the primary poker hand obtained a two pair hand ranking associated with an award of five credits and the second secondary hand obtained a three-of-a-kind poker hand ranking associated with an award of fifteen credits, the gaming system determined and displayed a total award of twenty credits.

It should be appreciated that while the play of the card game is illustrated as a play of a three hand poker game, any suitable quantity of hands of a poker game, such as, but not limited to, five hands, ten hands, fifty hands, one-hundred hands or one-thousand hands, may be employed in association with the present disclosure. It should be further appreciated that while the play of the card game is illustrated as a play of a multiple hand poker game, any suitable type of poker game, such as, but not limited to, a single hand poker game, Texas Hold'em, Omaha, Three Card Poker, Four Card Poker, Seven Card Stud, Pai Gow Poker, Caribbean Stud Poker, Let It Ride Poker, as well as any suitable non-poker cards game such as, but not limited to, blackjack, Baccarat, Spanish 21, Casino War, Super Fun 21, and Vegas Three Card Rummy, may be employed in association with the present disclosure.

In addition to determining and displaying any award associated with the displayed playing cards of the card game, the gaming system determines if a point accumulation event occurred in association with the play of the card game as indicated in diamond 110 of FIG. 1.

If the gaming system determines that the point accumulation event did not occur, the gaming system returns to block 104 and awaits another occurrence of a card game triggering event. In certain embodiments, the lack of a point accumulation event has no effect of any previously accumulated points such that any points accumulated since the last triggering of the secondary event persist for another play of the card game upon another occurrence of the card game triggering event. In certain embodiments, the lack of a point accumulation event may effect zero, one or more previously accumulated points. In one such embodiment, any accumulated points persist for a period of time and/or quantity of subsequent plays of the card game wherein if a point accumulation event does not occur within the period of time and/or quantity of subsequent plays of the card game, such previously accumulated points expire.

If the gaming system determines that a point accumulation event occurred, the gaming system then determines and accumulates a quantity of points in association with the occurrence of the point accumulation event as indicated in blocks 112 and 114. In certain embodiments, if the gaming system determines that the point accumulation event occurred, the gaming system increments a point meter. In one such embodiment, the gaming system displays a non-numerical indication of the point meter such that the user is generally aware of a total quantity of points currently accumulated without being aware of a specific total quantity of points currently accumulated. In another such embodiment, the gaming system displays an indication of the point meter without displaying an indication of the determined threshold quantity of points such that the user is aware of a total quantity of points currently accumulated without being aware of that total relative to a threshold quantity of points.

Figure 2E:
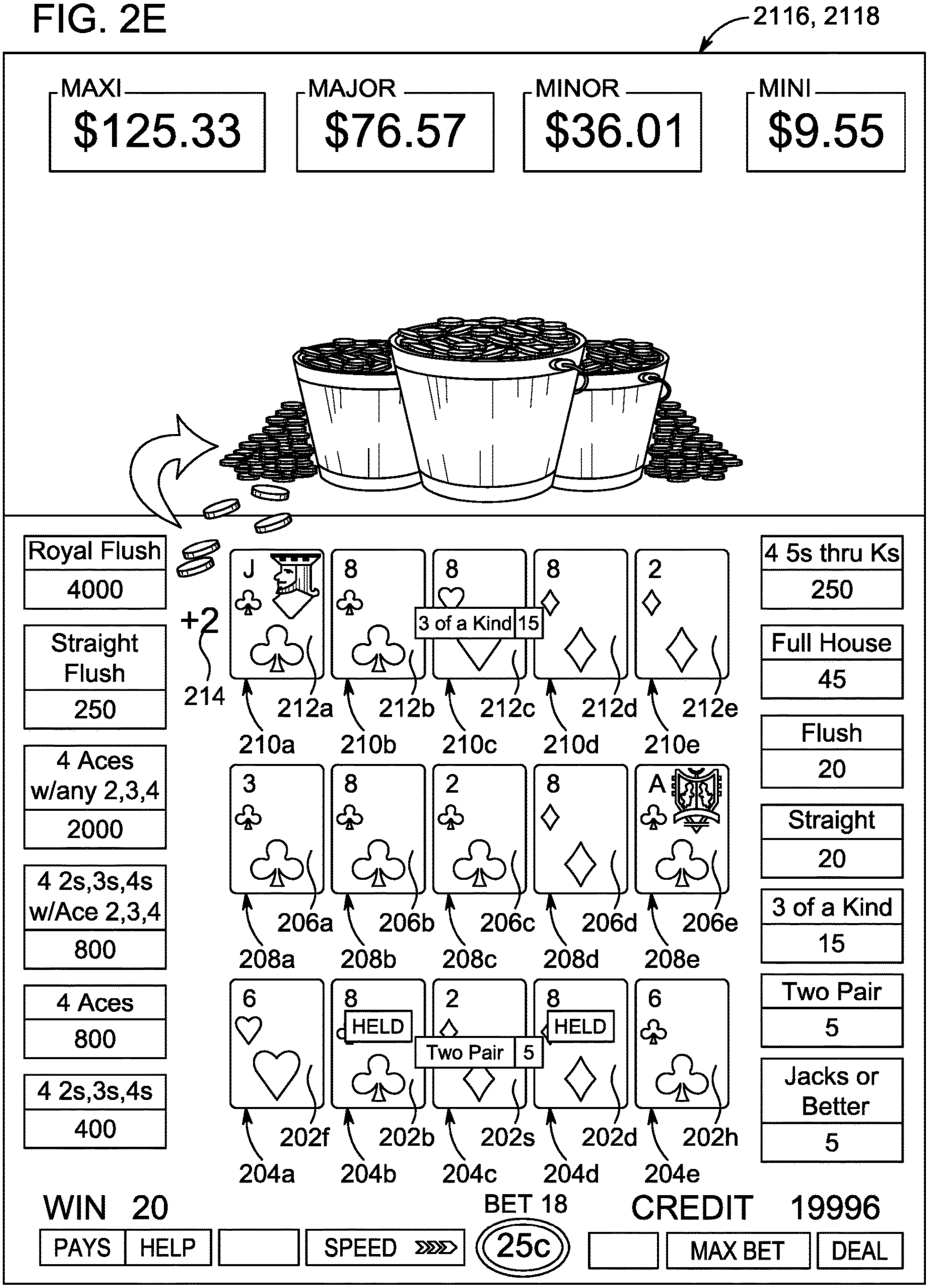

In certain embodiments, a point accumulation event occurs in association with the determined outcome of the play of the card game. In one such embodiment, different determined outcomes are associated with different quantities of accumulated points. For example, as seen in FIG. 2E, a three-of-a-kind poker game outcome is associated with an accumulation of two points 214, while a full house poker game outcome is associated with an accumulation of three points (not shown in FIG. 2E), and a four-of-a-kind poker game outcome is associated with an accumulation of five points (also not shown in FIG. 2E). Such a configuration of different game outcomes being associated with different quantities of accumulated points provides that the randomness of which game outcomes are determined during a first period of time factors into the probability of one or more events occurring during a second, subsequent period of time. In another such embodiment, different determined outcomes are associated with the same quantity of accumulated points. For example, a three-of-a-kind poker game outcome is associated with an accumulation of two points, a full house poker game poker game outcome is associated with an accumulation of two points, and a four-of-a-kind poker game outcome is associated with an accumulation of two points.

In certain embodiments, a point accumulation event occurs and a quantity of points are accumulated in association with a combination of outcomes of the play of the card game. For example, one winning hand of a play of a multiple hand poker game is not associated with an occurrence of a point accumulation event, but two or more winnings hands of a play of a multiple hand poker game is associated with an occurrence of a point accumulation event and an accumulation of a quantity of points. In another example, one winning hand followed by a losing hand of consecutive plays of a single hand poker game is not associated with an occurrence of a point accumulation event, but two or more winning hands in consecutive plays of a single hand poker game is associated with an occurrence of a point accumulation event and an accumulation of a quantity of points. In certain such embodiments, different combinations of outcomes are associated with different quantities of accumulated points. In other such embodiments, different combinations of outcomes are associated with the same quantity of accumulated points.

In certain embodiments, a point accumulation event occurs in association with the individual playing cards that form the determined outcome of the play of the card game. In one such embodiment, different individual playing cards are associated with different quantities of accumulated points. For example, a king playing card is associated with an accumulation of two points and an ace playing card is associated with an accumulation of three points. In another such embodiment, playing cards of the same rank but different suits are associated with different quantities of accumulated points. For example, a king of hearts playing card is associated with an accumulation of two points and a king of spades playing card is associated with an accumulation of three points. In another such embodiment, playing cards of the same suit but different ranks are associated with different quantities of accumulated points. For example, a king of hearts playing card is associated with an accumulation of two points and an ace of hearts playing card is associated with an accumulation of three points. In one such embodiment, different individual playing cards are associated with the same quantity of accumulated points.

In certain embodiments, a point accumulation event occurs in association with combinations of playing cards that form the determined outcome of the play of the card game. In one such embodiment, different combinations of playing cards are associated with different quantities of accumulated points. For example, obtaining two or more ace playing cards in consecutive plays of a single hand poker game is associated with an occurrence of a point accumulation event and an accumulation of a first quantity of points while obtaining two or more queen playing cards in consecutive plays of a single hand poker game is associated with an occurrence of a point accumulation event and an accumulation of a second, different quantity of points. In another such embodiment, different combinations of playing cards are associated with the same quantity of accumulated points.

It should be appreciated that the accumulation of a quantity of points in association with a play of a card game occurs independent from the accumulation of part of an award associated with the growth of one or more of the progressive awards maintained by the gaming system. Put differently, in association with a play of a card game, the gaming system may both allocate an amount of funds to one or more progressive awards and separately allocate a quantity of points to the total quantity of accumulated points (wherein as described below, the allocation of the quantity of points may result in an opportunity to win one or more of the progressive awards).

It should be further appreciated that while described as the point accumulation event occurring in association with one or more displayed aspects of the play of the card game, in certain embodiments, the point accumulation event may alternatively or additionally occur and points may be accumulated in association with one or more non-displayed aspects of the play of the card game and/or one or more occurrences independent of the play of the card game. In different embodiments, a point accumulation event occurs and a quantity of points are accumulated in association with one or more of: the initiation of the play of the card game, such as in association with a wager placed (or an amount of the wager placed) on the play of the card game; a non-card game related interaction tracked by the gaming system, such as an event occurring during a play of a sporting event which is tracked by the gaming system; a deposit of an amount of funds; an identification of a user (or a designated user); any user (or a designated user) placing a wager (regardless of the wager amount); any user (or a designated user) placing a side-wager (regardless of the side-wager amount); any user (or a designated user) engaging an input device of the EGM to cause a generation of an outcome; a triggering of a play of a secondary game; an activation of a secondary display; an activation of a community award generator; a generation of any outcome (or a designated outcome) in a secondary game; any user (or a designated user) engaging an input device of the EGM to make a selection in a game; an amount of time elapsed; any event which is tracked for a group of EGMs; any event which includes a group of EGMs working together for each occurrence of such tracked event; any event which is tracked for a group of users; any event which includes a group of users working together for each occurrence of such tracked event; and/or any suitable event which occurs in association with a user's gaming experience. It should be appreciated that in various embodiments, the point accumulation event may occur responsive to any suitable event which occurs in association with: (a) one or more plays of one or more primary games, (b) one or more plays of one or more secondary games, or (c) one or more occurrences which are independent of any primary or secondary games played. Accordingly, any action, any inaction, and/or any decision the user makes in association with their gaming experience may lead to the accumulation of a quantity of points and the potential triggering of the secondary event.

Following the accumulation of a quantity of points in association with the point accumulation event, the gaming system determines if a total quantity of accumulated points has reached the determined threshold quantity of points associated with a triggering of a secondary event as indicated in diamond 116. That is, the gaming system determines whether the triggering condition associated with the secondary event (i.e., whether the meter of accumulated points is at least equal to the threshold quantity of points associated with the next triggering of the second event) is satisfied. In other words, the gaming system tracks a total quantity of accumulated points relative to a determined threshold quantity of points (which is not displayed) such that the user of the gaming system is unaware of when a triggering of a secondary event that would not otherwise occur will be realized based on the occurrences of past events.

If the gaming system determines that the total quantity of accumulated points has not reached the determined threshold quantity of points, the gaming system returns to block 104 without triggering any secondary event and awaits another occurrence of a card game triggering event. For example, as seen in FIG. 2E, the accumulation of two points resulting from the outcome of a three-of-a-kind poker hand increased the total quantity of accumulated points but not enough to reach the determined threshold quantity of points such that no secondary event triggering event occurred.

In certain embodiments, the lack of a secondary event triggering event has no effect of any previously accumulated points such that any points accumulated since the last triggering of the secondary event persist for another play of the card game upon another occurrence of the card game triggering event. In these embodiments, the accumulated points persist over multiple plays of multiple games (and even in certain instances over multiple gaming sessions undertaken by different users) such that a game outcome of one play of a card game factors into zero, one or more events that occur in association with a subsequent play of the card game by the same user or even a different user. Put differently, any points accumulated in association with the current play of the card game persist for subsequent use in association with a future play of the card game such that even if a quantity of accumulated points does not cause a triggering of a secondary event in association with a current play of the game, such points are retained for a subsequent determination of whether to cause a triggering of a secondary event. In certain embodiments, the lack of a secondary event triggering event may effect zero, one or more previously accumulated points. In one such embodiment, any accumulated points persist for a period of time and/or quantity of subsequent plays of the card game wherein if a secondary event triggering event does not occur within the period of time and/or quantity of subsequent plays of the card game, such previously accumulated points expire.

Figure 2F:
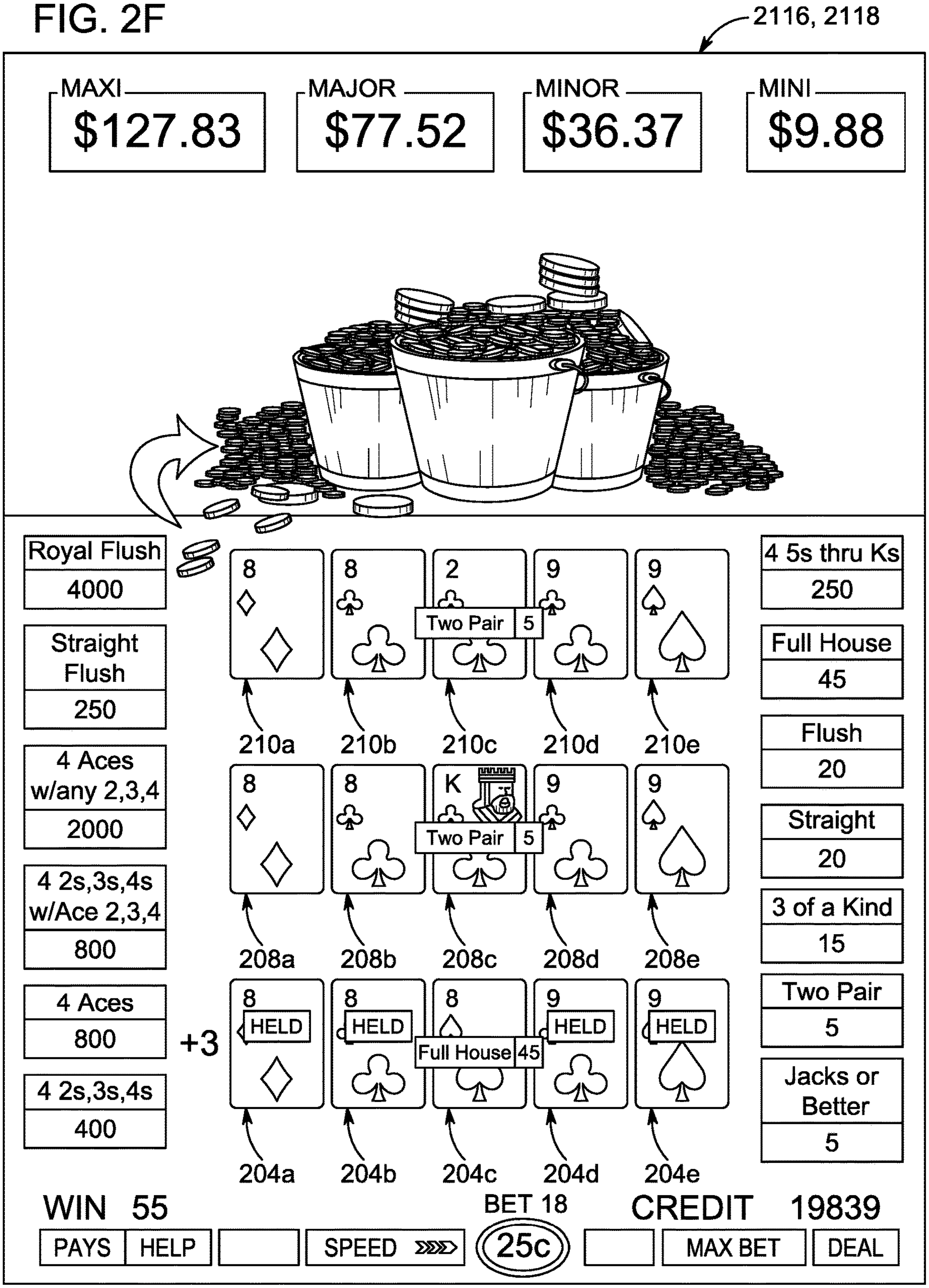
Figure 2G:
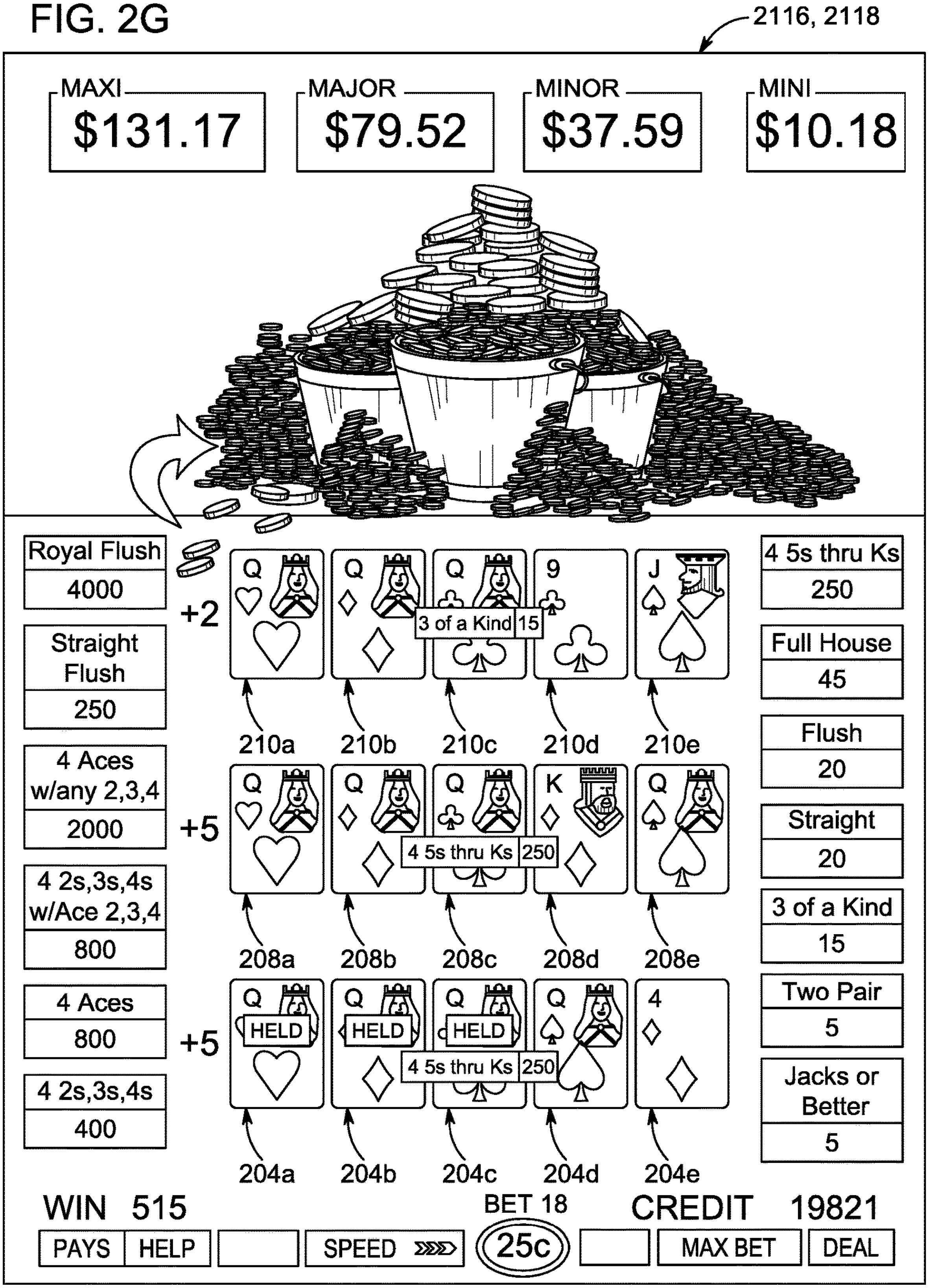
Figure 2H:
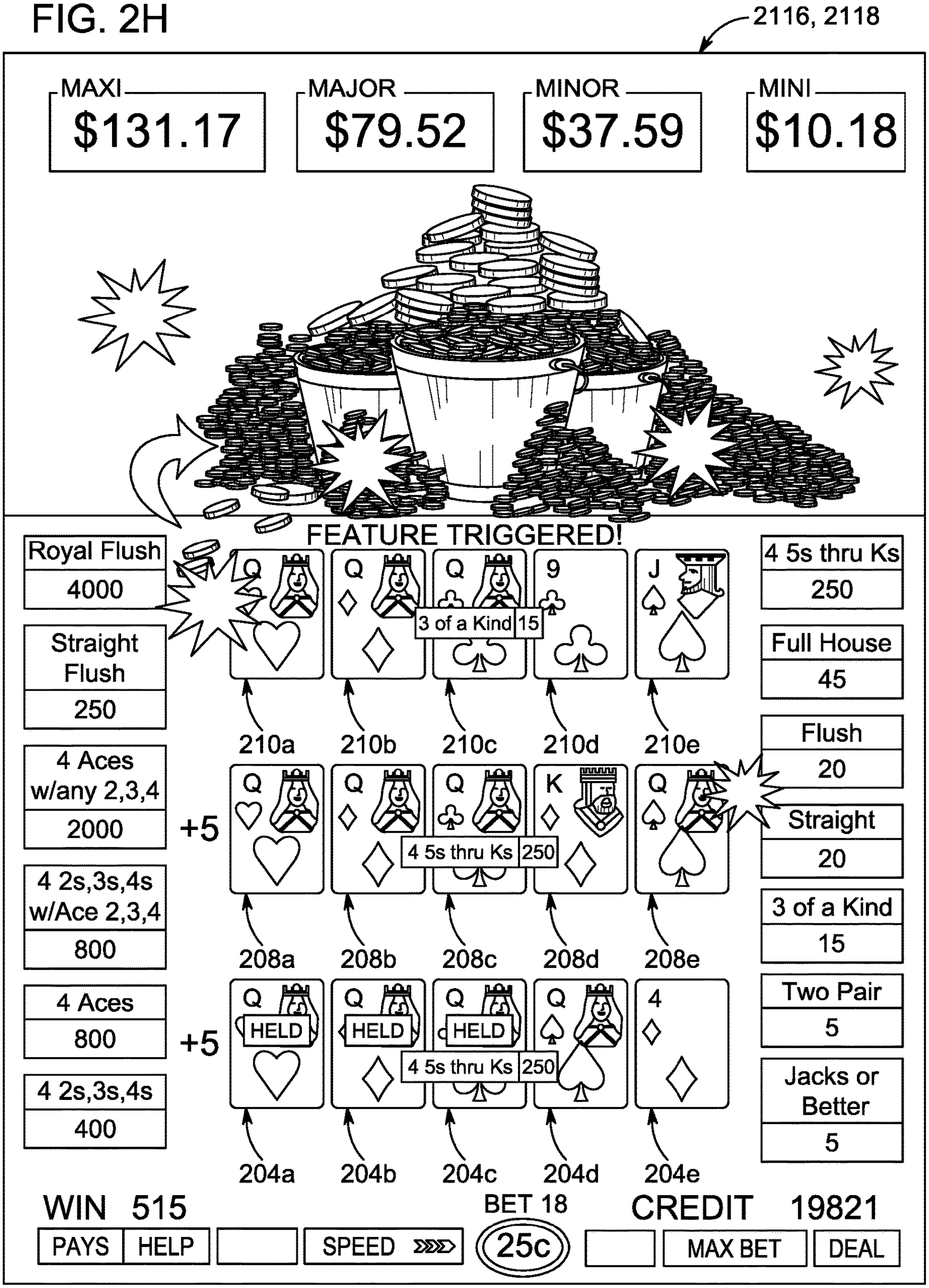

If the gaming system determines that the total quantity of accumulated points has reached the determined threshold quantity of points, the gaming system triggers a secondary event and, for the triggered secondary event, the gaming system determines and displays an award as indicated in blocks 118 and 120. For example, as seen in FIG. 2H, after a plurality of additional plays of the card game and a plurality of additional occurrence of the point accumulation event (as seen via the final card game outcomes and corresponding point accumulations, if applicable, in FIGS. 2F to 2G), the gaming system triggers the secondary game upon the total quantity of accumulated points having a predetermined relationship (e.g., reaching or exceeding) with the previously determined threshold quantity of points. As such, if the gaming system determines that the triggering condition associated with the secondary event is satisfied, then the gaming system proceeds to trigger the secondary event wherein such a triggering of the secondary event occurs in addition to (or alternatively in lieu of) the conclusion of the initiated play of the card game which includes the determination and display of a game outcome and the determination and display of any award associated with the game outcome.

Figure 2I:
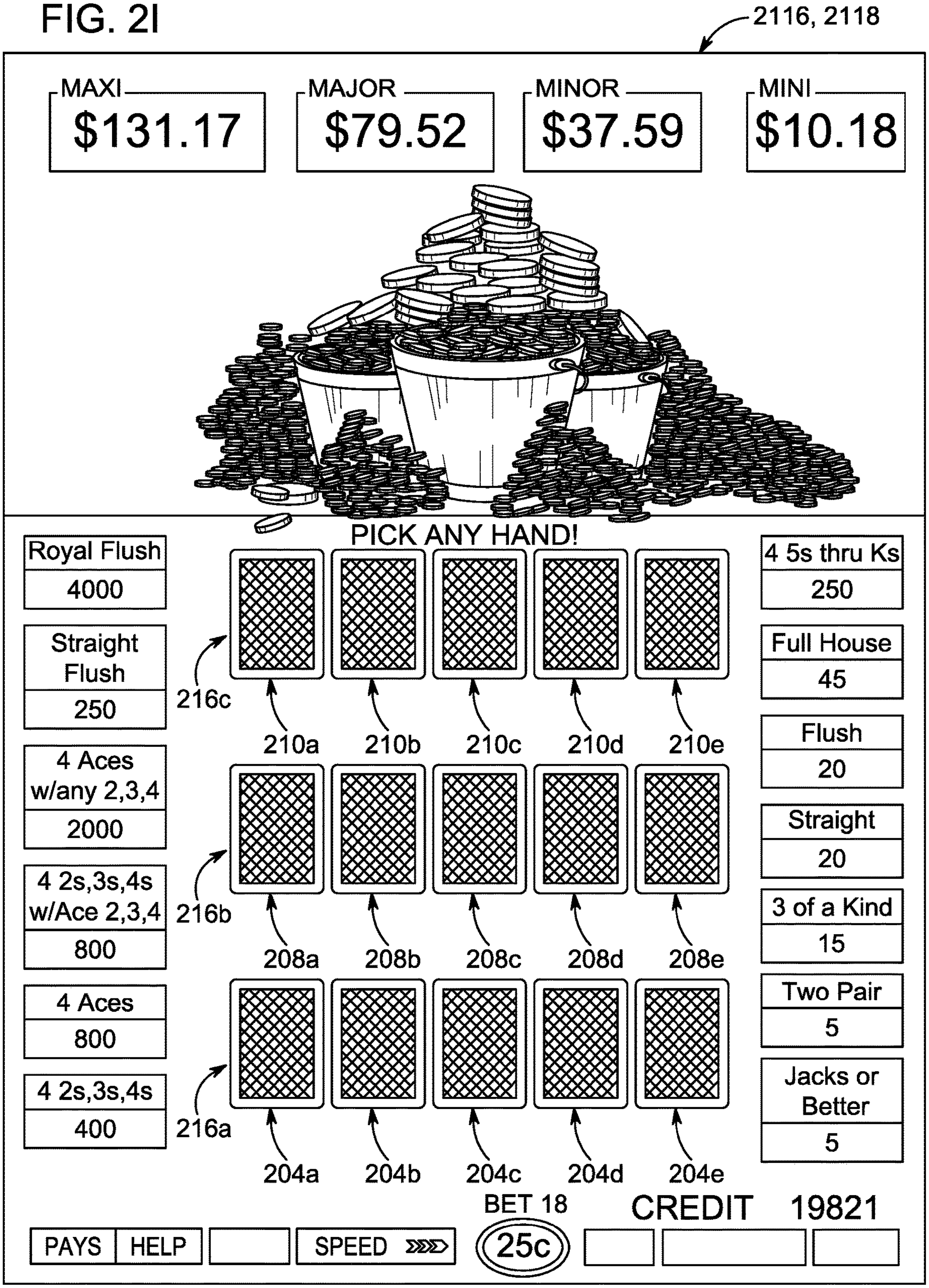
Figure 2J:
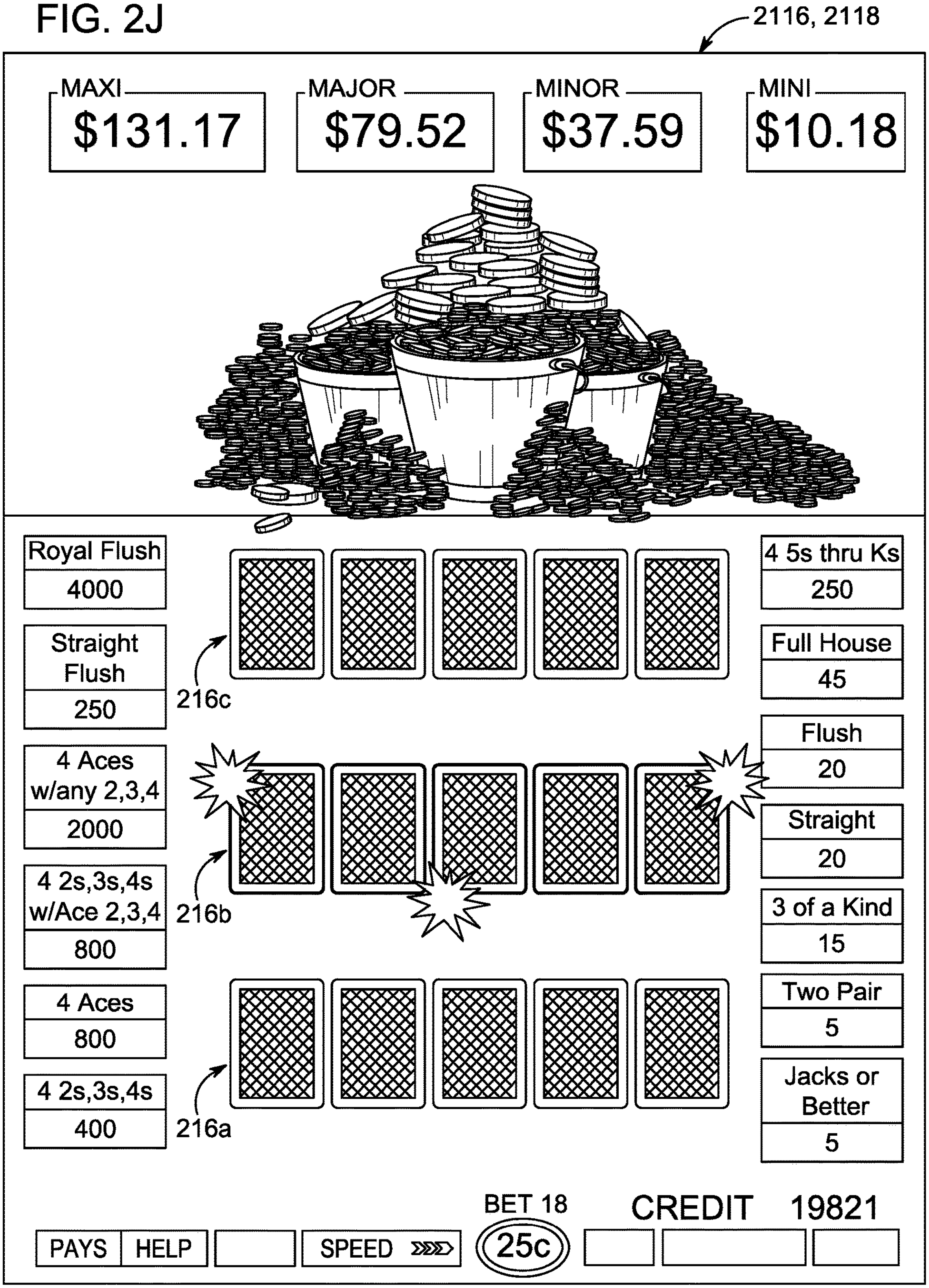
Figure 2K:
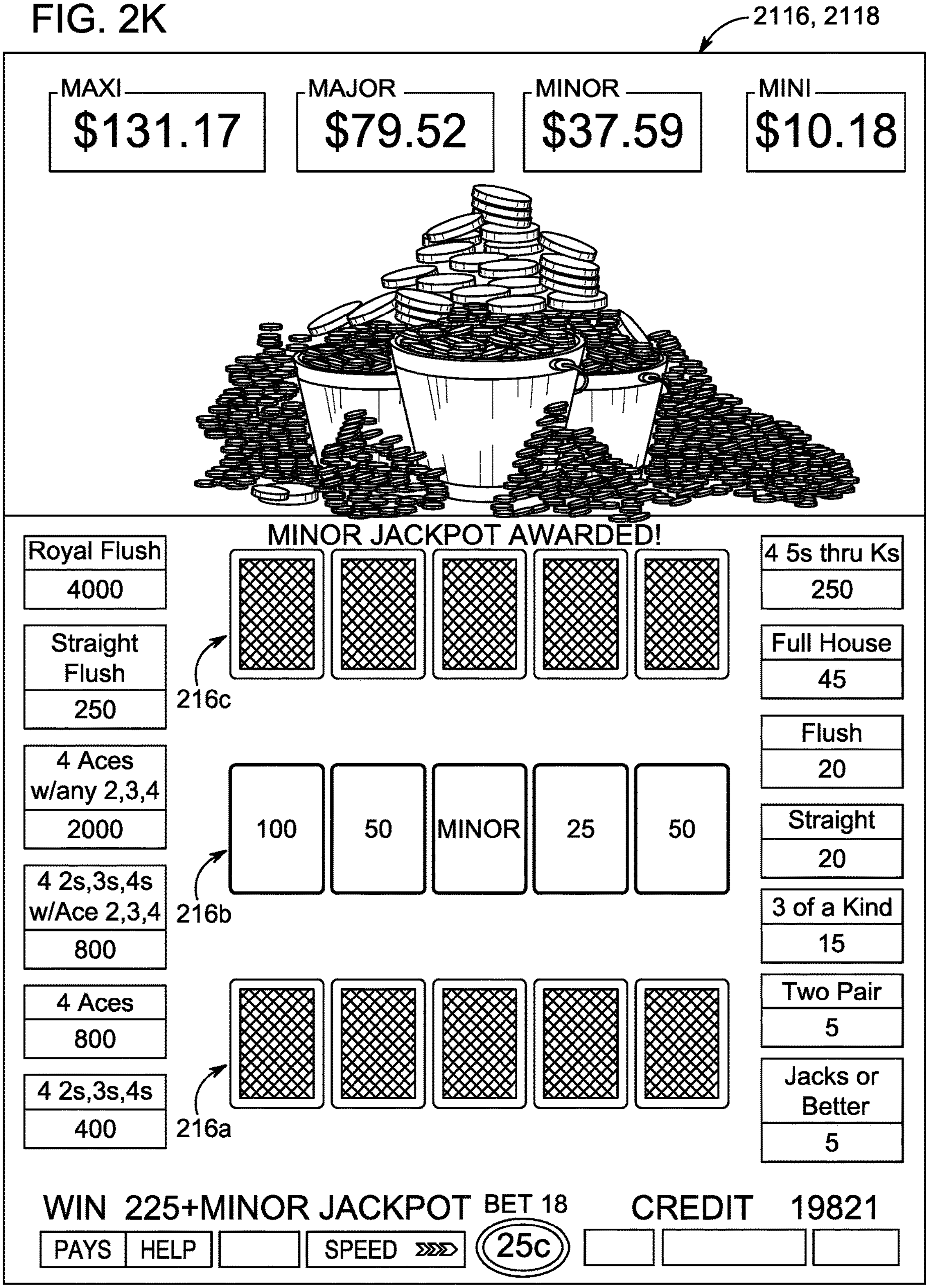
Figure 2L:
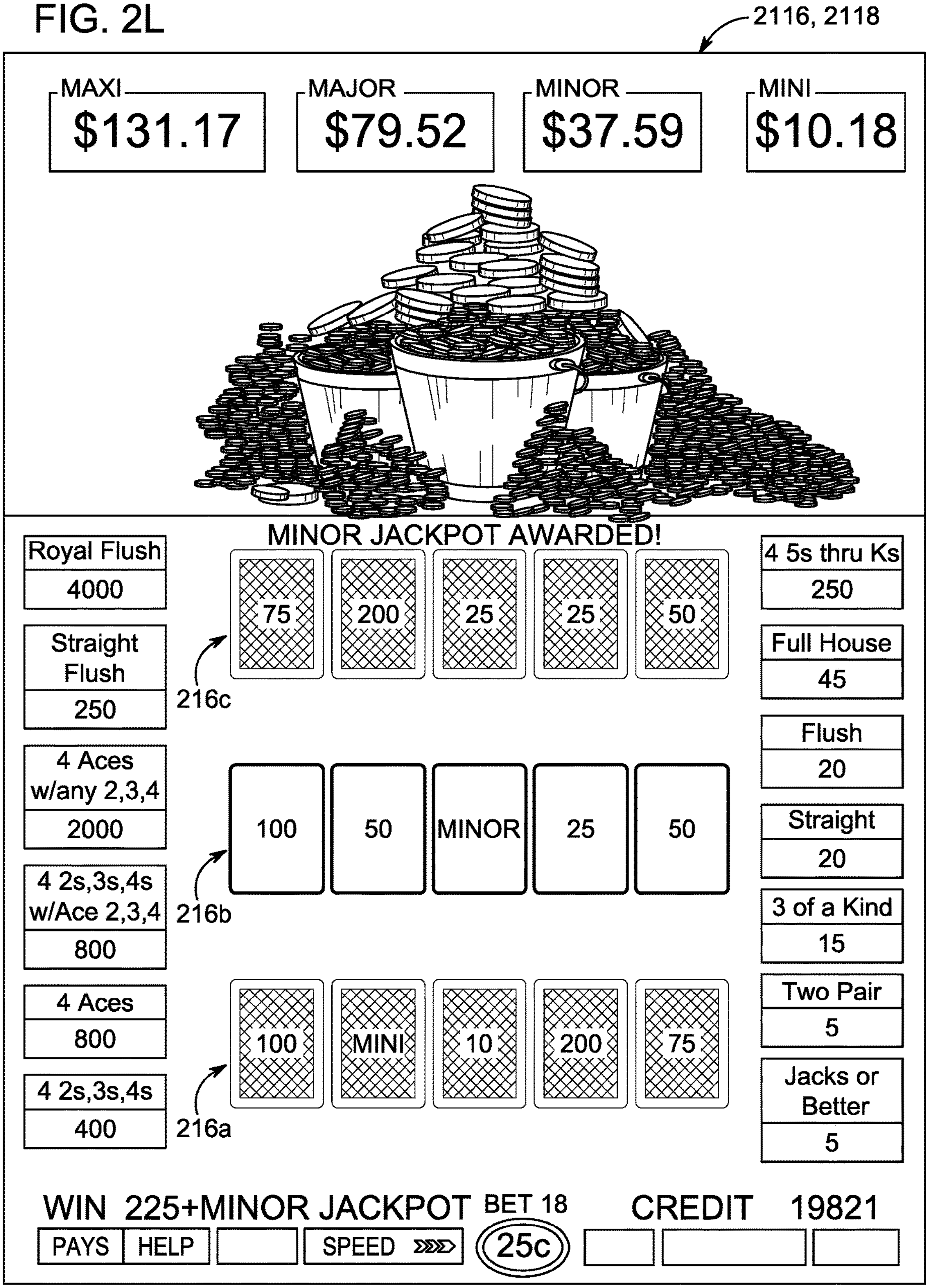

In certain embodiments, to determine and display an award for the triggered secondary game, the gaming system employs a play of a selection game wherein rather than selecting individual elements of the selection game, the gaming system enables the user to select groups of elements including a plurality of individual elements. In these embodiments, to save a user time in having to individually pick each of a plurality of individual elements of the selection game as well as to reduce the wear and tear on an input device utilized to make such picks, the gaming system enables a single input to account for multiple picks. For example, as seen in FIG. 2I, for a triggered secondary event, the gaming system displays a plurality of groups of selections 216*a* to 216*c* associated with the plurality of playing card positions 204, 206, 208 from the plays of the card game and enables the user to pick a group of selections. Following the user making a single input to pick a group of selections including a plurality of selections, the gaming system displays the awards associated with each of the picked selections. For example, as seen in FIGS. 2J to 2L, following the user making a single input to pick a group of selections 216*b* (FIG. 2J), the gaming system displayed the awards associated with each of the picked selections (FIG. 2K) as well as the awards associated with each of the non-picked selections (FIG. 2L). In different embodiments, the awards associated with the picked selections (or otherwise available during a triggered secondary event) include, but are not limited to, one or more of: a progressive award of the maintained MLP configuration (e.g., as seen in FIG. 2K, the Minor award currently valued at $36.01 associated with one of the selections of the picked group), a quantity of monetary credits (e.g., as also seen in FIG. 2K, the values of one-hundred credits, fifty credits, twenty-five credits and fifty credits associated with the remaining four selections of the picked group), a quantity of non-monetary credits, a quantity of promotional credits, a quantity of player tracking points, a modifier, such as a multiplier, a quantity of free plays of one or more games, a quantity of plays of one or more secondary or bonus games, a multiplier of a quantity of free plays of a game, one or more lottery based awards, such as lottery or drawing tickets, a wager match for one or more plays of one or more games, an increase in the average expected payback percentage for one or more plays of one or more games, one or more products or services, one or more bonus credits usable for online play, a lump sum of player tracking points or credits, a multiplier for player tracking points or credits, an increase in a membership or player tracking level, one or more coupons or promotions usable within and/or outside of the gaming establishment, virtual goods associated with the gaming system, virtual goods not associated with the gaming system, an access code usable to unlock content on an internet.

It should be appreciated that, in certain embodiments, triggering the secondary event based on the accumulation of points and associating the different selections with static value awards and/or variable value awards (e.g., a progressive award of a maintained multi-level progressive award configuration) provides that the accumulation of one element (i.e., points) may result in the winning of another accumulated element (i.e., a progressive award) despite such accumulated elements being otherwise independent of each other. That is, the employment of the progressive awards in the triggered secondary event provides that the gaming system of the present disclosure utilizes the accumulation of trackable elements, such as points, associated with game outcomes of plays of card games to potentially trigger an event associated with an opportunity to win an award utilizing the accumulation of wagers placed on such plays of the card games (i.e., a progressive award).

In certain embodiments, the association between the quantity of groups of selections available and the quantity of hands of the played poker game enable the gaming system to vary the quantity of groups of selections available and/or the quantity of picks the user is enabled to make based on the quantity of hands of the poker game played. For example, if a secondary event is triggered in association with a play of a three-hand poker game, the gaming system enables the user to pick one of the three groups of available selections, but if a secondary event is triggered in association with a play of a ten-hand poker game, the gaming system enables the user to pick two of the ten groups of available selections.

In certain embodiments, the quantity of groups of selections available and/or the quantity of picks the user is enabled to make is additionally or alternatively based on the quantity of winning hands (or alternatively losing hands) of the poker game played. For example, if a secondary event is triggered in association with a play of a ten-hand poker game with two winning hands, the gaming system enables the user to pick one of the two groups of available selections that correspond to the playing card positions associated with the two winning hands, but if a secondary event is triggered in association with a play of a ten-hand poker game with five winning hands, the gaming system enables the user to pick two of the five groups of available selections that correspond to the playing cards positions associated with the five winning hands.

In certain embodiments, the secondary event includes a play of a secondary game to potentially win one or more awards. In different embodiments, the secondary event includes one or more plays of one or more games including, but not limited to: one or more plays of any suitable wheel game; one or more plays of any suitable card game; one or more plays of any suitable offer and acceptance game; one or more plays of any suitable award ladder game; one or more plays of any suitable puzzle-type game; one or more plays of any suitable persistence game; one or more plays of any suitable selection game; one or more plays of any suitable cascading symbols game; one or more plays of any suitable ways to win game; one or more plays of any suitable scatter pay game; one or more plays of any suitable coin-pusher game; one or more plays of any suitable elimination game; one or more plays of any suitable stacked wilds game; one or more plays of any suitable trail game; one or more plays of any suitable bingo game; one or more plays of any suitable video scratch-off game; one or more plays of any suitable pick-until-complete game; one or more plays of any suitable shooting simulation game; one or more plays of any suitable racing game; one or more plays of any suitable promotional game; one or more plays of any suitable high-low game; one or more plays of any suitable lottery game; one or more plays of any suitable number selection game; one or more plays of any suitable dice game; one or more plays of any suitable skill game; one or more plays of any suitable auction game; one or more plays of any suitable reverse-auction game; and/or one or more plays of any suitable group game.

In certain embodiments, the secondary event includes the activation or modification of one or more features for one or more games. In different embodiments, such features include, but are not limited to: a feature which modifies one or more game outcomes of one or more plays of a game (e.g., the symbols evaluated for the play(s) of the game); a feature which modifies the paytable utilized for one or more plays of the game; a feature which modifies any award determined for one or more plays of the game; a feature which superimposed one or more symbols over the randomly generated symbols of the reels; a feature which replaces one or more symbols of the randomly generated symbols of the reels with a predetermined symbol pattern; a feature which replaces one or more symbols of the randomly generated symbols of the reels with a predetermined pattern of wild symbols; a book-end wild symbols feature; a stacked wild symbols feature; an expanding wild symbols feature; a nudging wild symbols feature; a retrigger symbol feature; an anti-terminator symbol feature; a locking reel feature, a locking symbol position feature; a feature which provides an additional award amount to a user; a feature modifying an amount of credits of a credit balance; a feature modifying an amount of promotional credits; a feature modifying a rate of earning player tracking points; a feature modifying a triggering event of a play of a secondary or bonus game; a feature modifying an activation of a secondary or bonus display (such as an award generator); a feature modifying a quantity of activations of a secondary or bonus display (e.g., a feature modifying a quantity of spins of an award generator); a feature modifying a quantity of sections of a secondary or bonus display (e.g., a feature modifying a quantity of sections of an award generator); a feature modifying one or more awards of a secondary or bonus display; a feature modifying an activation of a community award generator; a feature modifying a quantity of activations of a community award generator; a feature modifying a quantity of sections of a community award generator; a feature modifying one or more awards of a community award generator; a feature modifying a generated outcome (or a designated generated outcome) in a secondary game; a feature modifying a placed wager amount; a feature modifying a placed side wager amount; a feature modifying a number of wagered on paylines; a feature modifying a wager placed on one or more paylines (or on one or more designated paylines); a feature modifying a number of ways to win wagered on; a feature modifying a wager placed on one or more ways to win (or on one or more designated ways to win); a feature modifying an average expected payback percentage of a play of a game; a feature modifying an average expected payout of a play of a game; a feature modifying one or more awards available; a feature modifying a range of awards available; a feature modifying a type of awards available; a feature modifying one or more progressive awards; a feature modifying which progressive awards are available to be won; a feature modifying an activation of a reel (or a designated reel); a feature modifying an activation of a plurality of reels; a feature modifying a generated outcome (or a designated generated outcome) on a designated payline; a feature modifying a generated outcome (or a designated generated outcome) in a scatter configuration; a feature modifying a winning way to win (or a designated winning way to win); a feature modifying a designated symbol or symbol combination; a feature modifying a generation of a designated symbol or symbol combination on a designated payline; a feature modifying a generation of a designated symbol or symbol combination in a scatter configuration; a feature modifying a quantity of picks in a selection game; a feature modifying a quantity of offers in an offer and acceptance game; a feature modifying a quantity of moves in a trail game; a feature modifying an amount of free spins provided; a feature modifying a game terminating or ending condition; a feature modifying how one or more aspects of one or more games (e.g., colors, speeds, sound) are displayed to a user; and/or a feature modifying any game play feature associated with any play of any game disclosed herein.

Following the triggering of the secondary event, as indicated in block 122, the gaming system resets the total quantity of points currently accumulated to a base quantity, such as zero points, and then returns to block 102 to determine another threshold quantity of points associated with another triggering of the secondary event. That is, following a conclusion of the secondary event triggered based on the total quantity of accumulated points reaching a threshold quantity of points, the gaming system causes an accumulated point reset event to occur and then proceeds with accumulating points to trigger another secondary event.

Accordingly, the gaming system of the present disclosure provides an engaging avenue whereby the more activity associated with a gaming system, the more points are accumulated and the more frequent secondary events occur. Such a configuration operable to trigger an event based on an amount of activity which that user (and potentially other user) partakes in dynamically alters how the gaming system operates to retain users engagement as certain users may be reluctant to depart a current gaming session which is currently associated with a lowered requirement (based on points accumulated relative to a threshold) to trigger a secondary event.

In one embodiment, the gaming system causes at least one display device of the gaming system to display the initiated card game and/or a triggered secondary event. In another embodiment, the gaming system additionally or alternatively causes one or more community or overhead display devices to display part or all of the initiated card game and/or a triggered secondary event to one or more other users or bystanders either at a gaming establishment or viewing over a network, such as the internet. In another embodiment, the gaming system additionally or alternatively causes one or more internet sites to each display the initiated card game and/or a triggered secondary event such that a user is enabled to log on from a personal web browser.

In different embodiments, a card game triggering event, a progressive award increment event, a point accumulation event, a triggering of a secondary event, and/or an accumulated point reset event occurs based on an outcome associated with one or more plays of any primary games. In one embodiment, such determinations are symbol driven based on the generation of one or more designated symbols or symbol combinations. In various embodiments, a generation of a designated symbol (or sub-symbol) or a designated set of symbols (or sub-symbols) over one or more plays of a primary game causes such conditions to be satisfied and/or one or more of such events to occur.

In different embodiments, the gaming system does not provide any apparent reasons for an occurrence of a card game triggering event, a progressive award increment event, a point accumulation event, a triggering of a secondary event, and/or an accumulated point reset event. In these embodiments, such determinations are not triggered by an event in a primary game or based specifically on any of the plays of any primary games. That is, these events occur without any explanation or alternatively with simple explanations.

In one such embodiment, a card game triggering event, a progressive award increment event, a point accumulation event, a triggering of a secondary event, and/or an accumulated point reset event occurs based on an amount of coin-in. In this embodiment, the gaming system determines if an amount of coin-in reaches or exceeds a designated amount of coin-in (i.e., a threshold coin-in amount). Upon the amount of coin-in wagered reaching or exceeding the threshold coin-in amount, the gaming system causes one or more of such events or conditions to occur. In another such embodiment, a card game triggering event, a progressive award increment event, a point accumulation event, a triggering of a secondary event, and/or an accumulated point reset event occurs based on an amount of virtual currency-in. In this embodiment, the gaming system determines if an amount of virtual currency-in wagered reaches or exceeds a designated amount of virtual currency-in (i.e., a threshold virtual currency-in amount). Upon the amount of virtual currency-in wagered reaching or exceeding the threshold virtual currency-in amount, the gaming system causes one or more of such events or conditions to occur. In different embodiments, the threshold coin-in amount and/or the threshold virtual currency-in amount is predetermined, randomly determined, determined based on a user's status (such as determined through a player tracking system), determined based on a generated symbol or symbol combination, determined based on a random determination by the central controller, determined based on a random determination at the EGM, determined based on one or more side wagers placed, determined based on the primary game wager, determined based on time (such as the time of day) or determined based on any other suitable method or criteria.

In one such embodiment, a card game triggering event, a progressive award increment event, a point accumulation event, a triggering of a secondary event, and/or an accumulated point reset event occurs based on an amount of coin-out. In this embodiment, the gaming system determines if an amount of coin-out reaches or exceeds a designated amount of coin-out (i.e., a threshold coin-out amount). Upon the amount of coin-out reaching or exceeding the threshold coin-out amount, the gaming system causes one or more of such events or conditions to occur. In another such embodiment, a card game triggering event, a progressive award increment event, a point accumulation event, a triggering of a secondary event, and/or an accumulated point reset event occurs based on an amount of virtual currency-out. In this embodiment, the gaming system determines if an amount of virtual currency-out reaches or exceeds a designated amount of virtual currency-out (i.e., a threshold virtual currency-out amount). Upon the amount of virtual currency-out reaching or exceeding the threshold virtual currency-out amount, the gaming system causes one or more of such events or conditions to occur. In different embodiments, the threshold coin-out amount and/or the threshold virtual currency-out amount is predetermined, randomly determined, determined based on a user's status (such as determined through a player tracking system), determined based on a generated symbol or symbol combination, determined based on a random determination by the central controller, determined based on a random determination at the EGM, determined based on one or more side wagers placed, determined based on the primary game wager, determined based on time (such as the time of day) or determined based on any other suitable method or criteria.

In different embodiments, a card game triggering event, a progressive award increment event, a point accumulation event, a triggering of a secondary event, and/or an accumulated point reset event occurs based on a predefined variable reaching a defined parameter threshold. For example, when the 500,000$^{th}$ user has played an EGM (ascertained from a player tracking system), one or more of such events or conditions occur. In different embodiments, the predefined parameter thresholds include a length of time, a length of time after a certain dollar amount is hit, a wager level threshold for a specific device (which EGM is the first to contribute $250,000), a number of EGMs active, or any other parameter that defines a suitable threshold.

In different embodiments, a card game triggering event, a progressive award increment event, a point accumulation event, a triggering of a secondary event, and/or an accumulated point reset event occurs based on a quantity of games played. In this embodiment, a quantity of games played is set for when one or more of such events or conditions will occur. In one embodiment, such a set quantity of games played is based on historic data.

In different embodiments, a card game triggering event, a progressive award increment event, a point accumulation event, a triggering of a secondary event, and/or an accumulated point reset event occurs based on time. In this embodiment, a time is set for when one or more of such events or conditions will occur. In one embodiment, such a set time is based on historic data.

In different embodiments, a card game triggering event, a progressive award increment event, a point accumulation event, a triggering of a secondary event, and/or an accumulated point reset event occurs based upon gaming system operator defined user eligibility parameters stored on a player tracking system (such as via a player tracking card or other suitable manner). In this embodiment, the parameters for eligibility are defined by the gaming system operator based on any suitable criterion. In one embodiment, the gaming system recognizes the user's identification (via the player tracking system) when the user inserts or otherwise associates their player tracking card in the EGM and/or logs into the player tracking system using a mobile device, such as a personal gaming device. The gaming system determines the player tracking level of the user and if the current player tracking level defined by the gaming system operator is eligible for one or more of such events or conditions. In one embodiment, the gaming system operator defines minimum bet levels required for such events or conditions to occur based on the user's card level.

In different embodiments, a card game triggering event, a progressive award increment event, a point accumulation event, a triggering of a secondary event, and/or an accumulated point reset event occurs based on a system determination, including one or more random selections by the central controller. For example, as described above, the gaming system tracks all active EGMs and the wagers they placed, wherein based on the EGM's state as well as one or more wager pools associated with the EGM, the gaming system determines whether to one or more of such events or conditions will occur. In one such embodiment, the user who consistently places a higher wager is more likely to be associated with an occurrence of one or more of such events or conditions than a user who consistently places a minimum wager. It should be appreciated that the criteria for determining whether a user is in active status or inactive status for determining if one or more of such events occur may the same as, substantially the same as, or different than the criteria for determining whether a user is in active status or inactive status for another one of such events to occur.

In different embodiments, a card game triggering event, a progressive award increment event, a point accumulation event, a triggering of a secondary event, and/or an accumulated point reset event occurs based on a determination of if any numbers allotted to an EGM match a randomly selected number. In this embodiment, upon or prior to each play of each EGM, an EGM selects a random number from a range of numbers and during each primary game, the EGM allocates the first N numbers in the range, where N is the number of credits bet by the user in that primary game. At the end of the primary game, the randomly selected number is compared with the numbers allocated to the user and if a match occurs, one or more of such events or conditions occur.

It should be appreciated that any suitable manner of causing a card game triggering event, a progressive award increment event, a point accumulation event, a triggering of a secondary event, and/or an accumulated point reset event to occur may be implemented in accordance with the gaming system and method disclosed herein. It should be further appreciated that one or more of the above-described triggers pertaining to a card game triggering event, a progressive award increment event, a point accumulation event, a triggering of a secondary event, and/or an accumulated point reset event occurring may be combined in one or more different embodiments.

It should be appreciated that in different embodiments, one or more of: when a card game triggering event, a progressive award increment event, a point accumulation event, a triggering of a secondary event, and/or an accumulated point reset event occurs; a quantity of points to accumulate in association with a point accumulation event; a quantity of points to set as a threshold quantity of points to trigger a secondary event; and/or any determination disclosed herein is/are predetermined, randomly determined, randomly determined based on one or more weighted percentages, determined based on a generated symbol or symbol combination, determined independent of a generated symbol or symbol combination, determined based on a random determination by the central controller, determined independent of a random determination by the central controller, determined based on a random determination at the gaming system, determined independent of a random determination at the gaming system, determined based on at least one play of at least one game, determined independent of at least one play of at least one game, determined based on a user's selection, determined independent of a user's selection, determined based on one or more side wagers placed, determined independent of one or more side wagers placed, determined based on the user's primary game wager, determined independent of the user's primary game wager, determined based on time (such as the time of day), determined independent of time (such as the time of day), determined based on an amount of coin-in accumulated in one or more pools, determined independent of an amount of coin-in accumulated in one or more pools, determined based on a status of the user (i.e., a player tracking status), determined independent of a status of the user (i.e., a player tracking status), determined based on one or more other determinations disclosed herein, determined independent of any other determination disclosed herein or determined based on any other suitable method or criteria.

The above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. A "gaming system" as used herein refers to various configurations of: (a) one or more servers; (b) one or more electronic gaming machines such as those located on a casino floor; and/or (c) one or more personal gaming devices. Thus, in various embodiments, the gaming system of the present disclosure includes: (a) one or more electronic gaming machines in combination with one or more servers; (b) one or more personal gaming devices in combination with one or more servers; (c) one or more personal gaming devices in combination with one or more electronic gaming machines; (d) one or more personal gaming devices, one or more electronic gaming machines, and one or more servers in combination with one another; (e) a single electronic gaming machine; (f) a plurality of electronic gaming machines in combination with one another; (g) a single personal gaming device; (h) a plurality of personal gaming devices in combination with one another; (i) a single server; and/or (j) a plurality of servers in combination with one another. For brevity and clarity and unless specifically stated otherwise, "EGM" as used herein represents one EGM or a plurality of EGMs, "personal gaming device" as used herein represents one personal gaming device or a plurality of personal gaming devices, and "server" as used herein represents one server or a plurality of servers.

As noted above, in various embodiments, the gaming system includes an EGM (or personal gaming device) in combination with a server. In such embodiments, the EGM (or personal gaming device) is configured to communicate with the server through a data network or remote communication link. In certain such embodiments, the EGM (or personal gaming device) is configured to communicate with another EGM (or personal gaming device) through the same data network or remote communication link or through a different data network or remote communication link. For example, the gaming system includes a plurality of EGMs that are each configured to communicate with a server through a data network.

In certain embodiments in which the gaming system includes an EGM (or personal gaming device) in combination with a server, the server is any suitable computing device (such as a server) that includes at least one processor and at least one memory device or data storage device. As further described herein, the EGM (or personal gaming device) includes at least one EGM (or personal gaming device) processor configured to transmit and receive data or signals representing events, messages, commands, or any other suitable information between the EGM (or personal gaming device) and the server. The at least one processor of that EGM (or personal gaming device) is configured to execute the events, messages, or commands represented by such data or signals in conjunction with the operation of the EGM (or personal gaming device). Moreover, the at least one processor of the server is configured to transmit and receive data or signals representing events, messages, commands, or any other suitable information between the server and the EGM (or personal gaming device). The at least one processor of the server is configured to execute the events, messages, or commands represented by such data or signals in conjunction with the operation of the server. One, more than one, or each of the functions of the server may be performed by the at least one processor of the EGM (or personal gaming device). Further, one, more than one, or each of the functions of the at least one processor of the EGM (or personal gaming device) may be performed by the at least one processor of the server.

In certain such embodiments, computerized instructions for controlling any games (such as any primary or base games and/or any secondary or bonus games) displayed by the EGM (or personal gaming device) are executed by the server. In such "thin client" embodiments, the server remotely controls any games (or other suitable interfaces) displayed by the EGM (or personal gaming device), and the EGM (or personal gaming device) is utilized to display such games (or suitable interfaces) and to receive one or more inputs or commands. In other such embodiments, computerized instructions for controlling any games displayed by the EGM (or personal gaming device) are communicated from the server to the EGM (or personal gaming device) and are stored in at least one memory device of the EGM (or personal gaming device). In such "thick client" embodiments, the at least one processor of the EGM (or personal gaming device) executes the computerized instructions to control any games (or other suitable interfaces) displayed by the EGM (or personal gaming device).

In various embodiments in which the gaming system includes a plurality of EGMs (or personal gaming devices), one or more of the EGMs (or personal gaming devices) are thin client EGMs (or personal gaming devices) and one or more of the EGMs (or personal gaming devices) are thick client EGMs (or personal gaming devices). In other embodiments in which the gaming system includes one or more EGMs (or personal gaming devices), certain functions of one or more of the EGMs (or personal gaming devices) are implemented in a thin client environment, and certain other functions of one or more of the EGMs (or personal gaming devices) are implemented in a thick client environment. In one such embodiment in which the gaming system includes an EGM (or personal gaming device) and a server, computerized instructions for controlling any primary or base games displayed by the EGM (or personal gaming device) are communicated from the server to the EGM (or personal gaming device) in a thick client configuration, and computerized instructions for controlling any secondary or bonus games or other functions displayed by the EGM (or personal gaming device) are executed by the server in a thin client configuration.

In certain embodiments in which the gaming system includes: (a) an EGM (or personal gaming device) configured to communicate with a server through a data network; and/or (b) a plurality of EGMs (or personal gaming devices) configured to communicate with one another through a data network, the data network is a local area network (LAN) in which the EGMs (or personal gaming devices) are located substantially proximate to one another and/or the server. In one example, the EGMs (or personal gaming devices) and the server are located in a gaming establishment or a portion of a gaming establishment.

In other embodiments in which the gaming system includes: (a) an EGM (or personal gaming device) configured to communicate with a server through a data network; and/or (b) a plurality of EGMs (or personal gaming devices) configured to communicate with one another through a data network, the data network is a wide area network (WAN) in which one or more of the EGMs (or personal gaming devices) are not necessarily located substantially proximate to another one of the EGMs (or personal gaming devices) and/or the server. For example, one or more of the EGMs (or personal gaming devices) are located: (a) in an area of a gaming establishment different from an area of the gaming establishment in which the server is located; or (b) in a gaming establishment different from the gaming establishment in which the server is located. In another example, the server is not located within a gaming establishment in which the EGMs (or personal gaming devices) are located. In certain embodiments in which the data network is a WAN, the gaming system includes a server and an EGM (or personal gaming device) each located in a different gaming establishment in a same geographic area, such as a same city or a same state. Gaming systems in which the data network is a WAN are substantially identical to gaming systems in which the data network is a LAN, though the quantity of EGMs (or personal gaming devices) in such gaming systems may vary relative to one another.

In further embodiments in which the gaming system includes: (a) an EGM (or personal gaming device) configured to communicate with a server through a data network; and/or (b) a plurality of EGMs (or personal gaming devices) configured to communicate with one another through a data network, the data network is an internet (such as the Internet) or an intranet. In certain such embodiments, an Internet browser of the EGM (or personal gaming device) is usable to access an Internet game page from any location where an Internet connection is available. In one such embodiment, after the EGM (or personal gaming device) accesses the Internet game page, the server identifies a user before enabling that user to place any wagers on any plays of any wagering games. In one example, the server identifies the user by requiring a user account of the user to be logged into via an input of a unique username and password combination assigned to the user. The server may, however, identify the user in any other suitable manner, such as by validating a player tracking identification number associated with the user; by reading a player tracking card or other smart card inserted into a card reader (as described below); by validating a unique user identification number associated with the user by the server; or by identifying the EGM (or personal gaming device), such as by identifying the MAC address or the IP address of the Internet facilitator. In various embodiments, once the server identifies the user, the server enables placement of one or more wagers on one or more plays of one or more primary or base games and/or one or more secondary or bonus games, and displays those plays via the Internet browser of the EGM (or personal gaming device).

The server and the EGM (or personal gaming device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for users to use a variety of EGMs (or personal gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with users.

Figure 3:
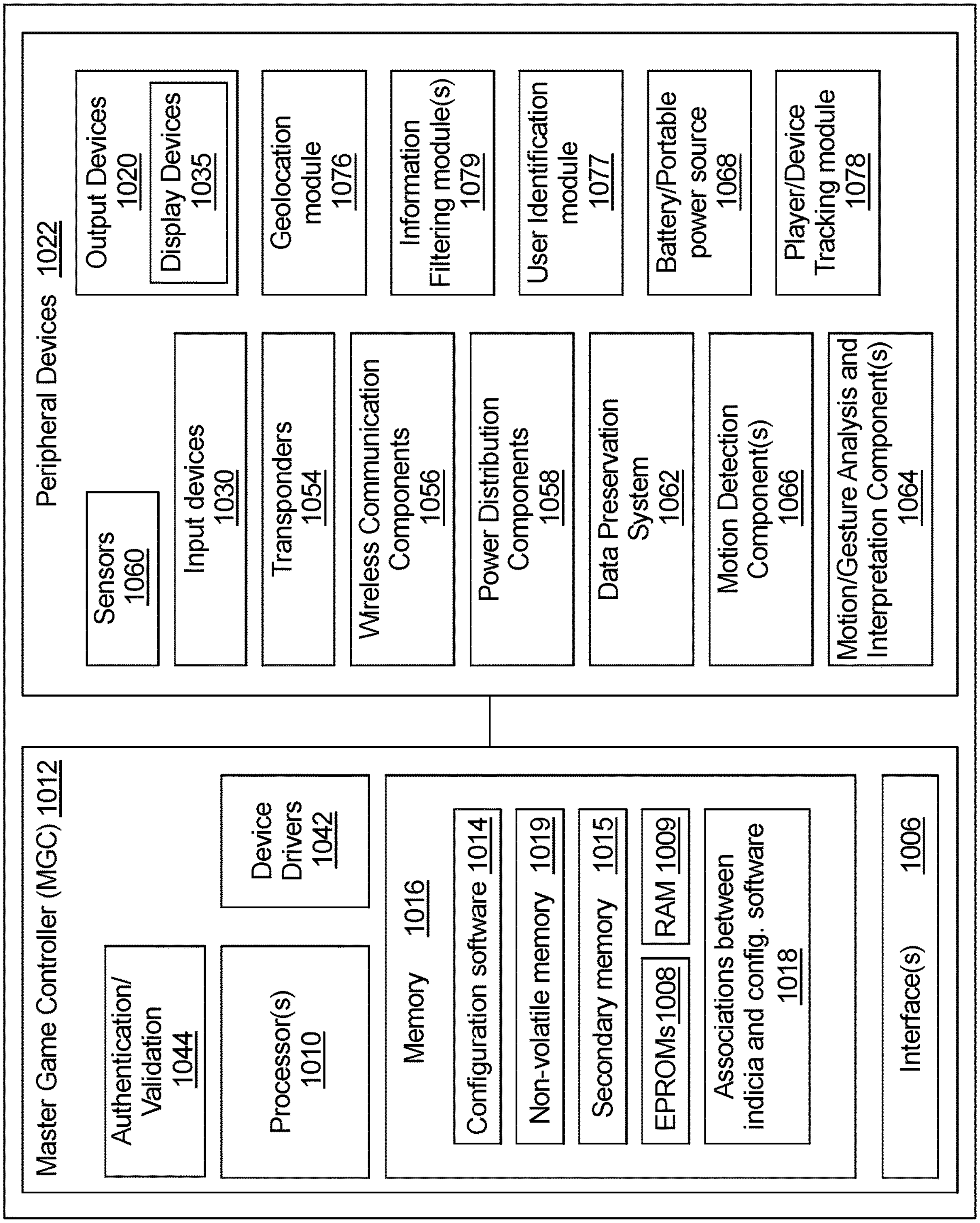
FIG. 3 is a schematic block diagram of one embodiment of an electronic configuration of an example electronic gaming machine of the present disclosure.
Figure 4A:
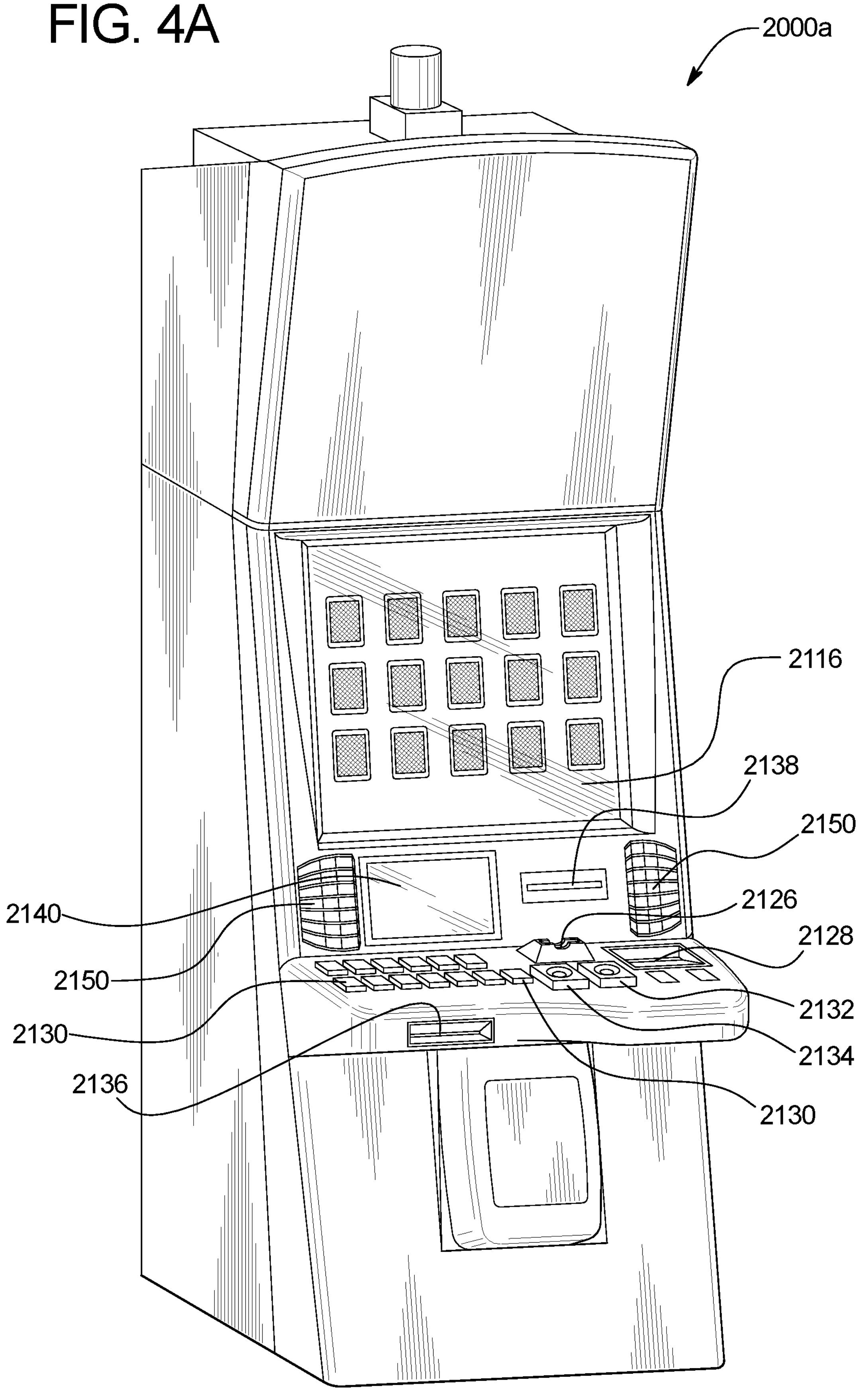
FIGS. 4A and 4B are perspective views of example alternative embodiments of an electronic gaming machine of the present disclosure.
Figure 4B:
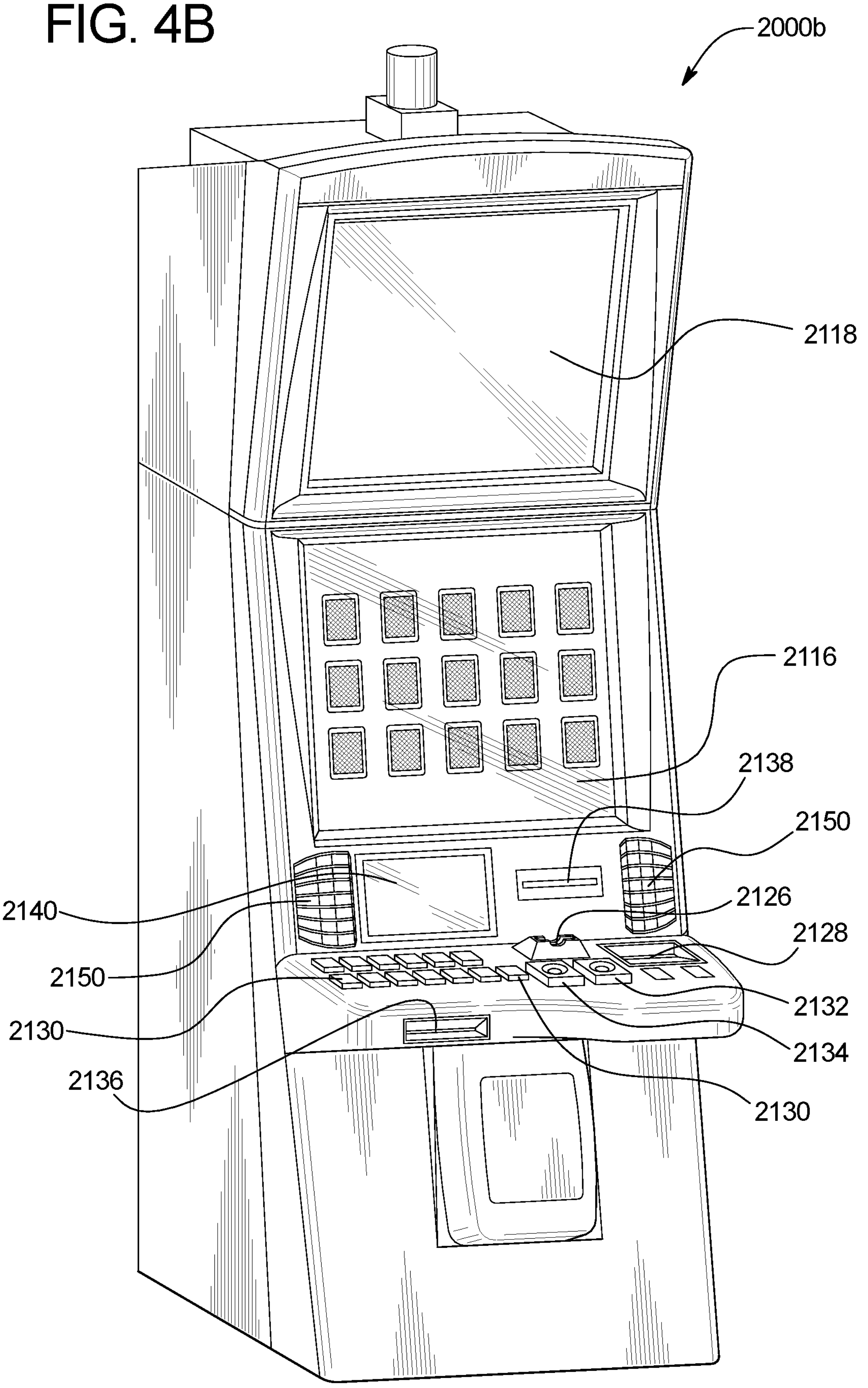
Figure 4C:
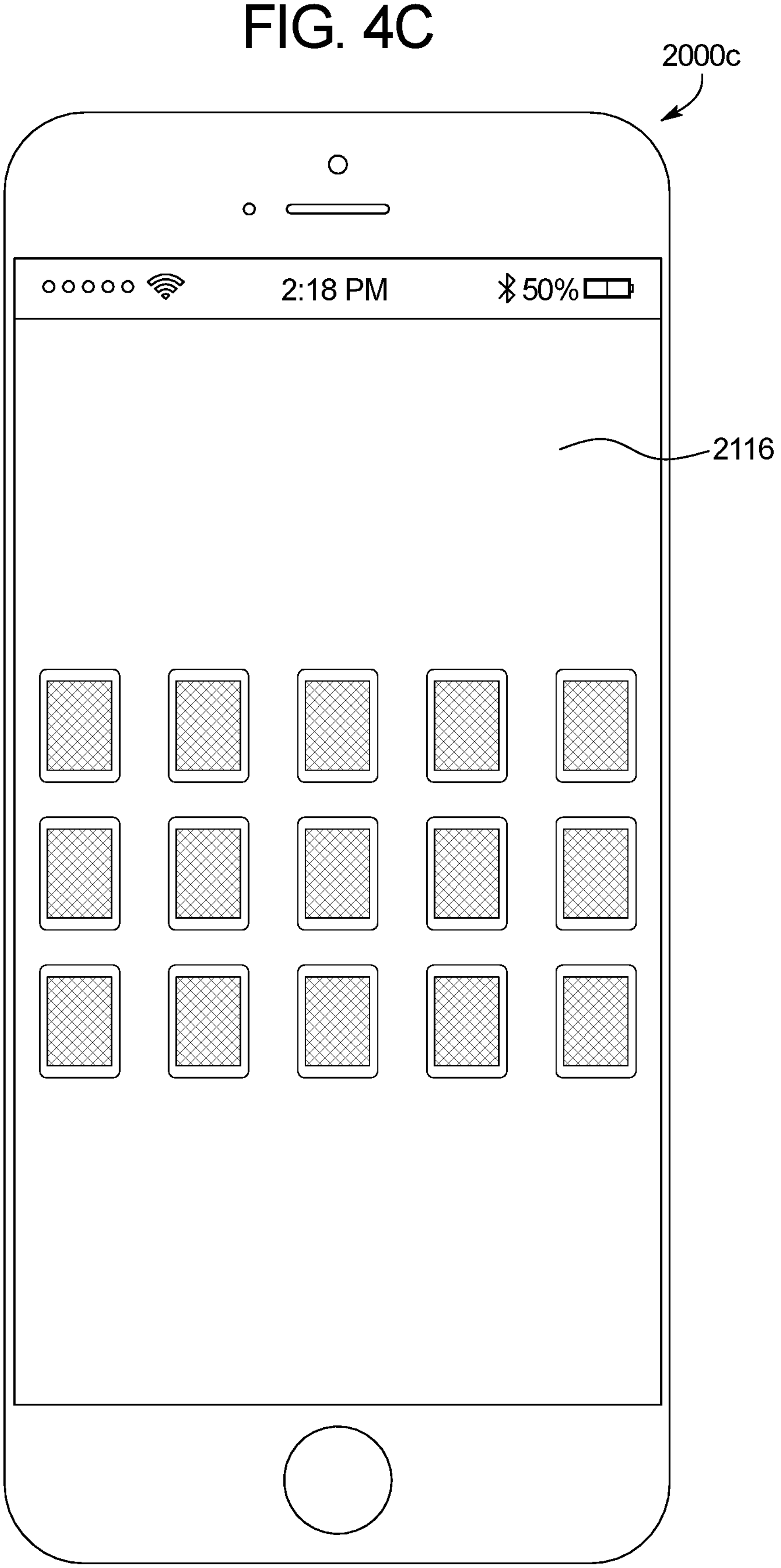
FIG. 4C is a front view of an example personal gaming device of the present disclosure.

FIG. 3 is a block diagram of an example EGM 1000 and FIGS. 4A and 4B include two different example EGMs 2000*a* and 2000*b*. The EGMs 1000, 2000*a*, and 2000*b* are merely example EGMs, and different EGMs may be implemented using different combinations of the components shown in the EGMs 1000, 2000*a*, and 2000*b*. Although the below refers to EGMs, in various embodiments personal gaming devices (such as personal gaming device 2000*c* of FIG. 4C) may include some or all of the below components.

In these embodiments, the EGM 1000 includes a master gaming controller 1012 configured to communicate with and to operate with a plurality of peripheral devices 1022.

The master gaming controller 1012 includes at least one processor 1010. The at least one processor 1010 is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or game information) via a communication interface 1006 of the master gaming controller 1012; (2) converting signals read by an interface to a format corresponding to that used by software or memory of the EGM; (3) accessing memory to configure or reconfigure game parameters in the memory according to indicia read from the EGM; (4) communicating with interfaces and the peripheral devices 1022 (such as input/output devices); and/or (5) controlling the peripheral devices 1022. In certain embodiments, one or more components of the master gaming controller 1012 (such as the at least one processor 1010) reside within a housing of the EGM (described below), while in other embodiments at least one component of the master gaming controller 1012 resides outside of the housing of the EGM.

The master gaming controller 1012 also includes at least one memory device 1016, which includes: (1) volatile memory (e.g., RAM 1009, which can include non-volatile RAM, magnetic RAM, ferroelectric RAM, and any other suitable forms); (2) non-volatile memory 1019 (e.g., disk memory, FLASH memory, EPROMs, EEPROMs, memristor-based non-volatile solid-state memory, etc.); (3) unalterable memory (e.g., EPROMs 1008); (4) read-only memory; and/or (5) a secondary memory storage device 1015, such as a non-volatile memory device, configured to store gaming software related information (the gaming software related information and the memory may be used to store various audio files and games not currently being used and invoked in a configuration or reconfiguration). Any other suitable magnetic, optical, and/or semiconductor memory may operate in conjunction with the EGM of the present disclosure. In certain embodiments, the at least one memory device 1016 resides within the housing of the EGM (described below), while in other embodiments at least one component of the at least one memory device 1016 resides outside of the housing of the EGM. In these embodiments, any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

The at least one memory device 1016 is configured to store, for example: (1) configuration software 1014, such as all the parameters and settings for a game playable on the EGM; (2) associations 1018 between configuration indicia read from an EGM with one or more parameters and settings; (3) communication protocols configured to enable the at least one processor 1010 to communicate with the peripheral devices 1022; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the EGM to communicate with local and non-local devices using such protocols. In one implementation, the master gaming controller 1012 communicates with other devices using a serial communication protocol. A few non-limiting examples of serial communication protocols that other devices, such as peripherals (e.g., a bill validator or a ticket printer), may use to communicate with the master game controller 1012 include USB, RS-232, and Netplex (a proprietary protocol developed by IGT).

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In certain embodiments, the at least one memory device 1016 is configured to store program code and instructions executable by the at least one processor of the EGM to control the EGM. The at least one memory device 1016 of the EGM also stores other operating data, such as image data, event data, input data, random number generators (RNGs) or pseudo-RNGs, paytable data or information, and/or applicable game rules that relate to the play of one or more games on the EGM. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a user uses such a removable memory device in an EGM to implement at least part of the present disclosure. In other embodiments, part or all of the program code and/or the operating data is downloaded to the at least one memory device of the EGM through any suitable data network described above (such as an Internet or intranet).

The at least one memory device 1016 also stores a plurality of device drivers 1042. Examples of different types of device drivers include device drivers for EGM components and device drivers for the peripheral components 1022. Typically, the device drivers 1042 utilize various communication protocols that enable communication with a particular physical device. The device driver abstracts the hardware implementation of that device. For example, a device driver may be written for each type of card reader that could potentially be connected to the EGM. Non-limiting examples of communication protocols used to implement the device drivers include Netplex, USB, Serial, Ethernet 175, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the EGM loads the new device driver from the at least one memory device to enable communication with the new device. For instance, one type of card reader in the EGM can be replaced with a second different type of card reader when device drivers for both card readers are stored in the at least one memory device.

In certain embodiments, the software units stored in the at least one memory device 1016 can be upgraded as needed. For instance, when the at least one memory device 1016 is a hard drive, new games, new game options, new parameters, new settings for existing parameters, new settings for new parameters, new device drivers, and new communication protocols can be uploaded to the at least one memory device 1016 from the master game controller 1012 or from some other external device. As another example, when the at least one memory device 1016 includes a CD/DVD drive including a CD/DVD configured to store game options, parameters, and settings, the software stored in the at least one memory device 1016 can be upgraded by replacing a first CD/DVD with a second CD/DVD. In yet another example, when the at least one memory device 1016 uses flash memory 1019 or EPROM 1008 units configured to store games, game options, parameters, and settings, the software stored in the flash and/or EPROM memory units can be upgraded by replacing one or more memory units with new memory units that include the upgraded software. In another embodiment, one or more of the memory devices, such as the hard drive, may be employed in a game software download process from a remote software server.

In some embodiments, the at least one memory device 1016 also stores authentication and/or validation components 1044 configured to authenticate/validate specified EGM components and/or information, such as hardware components, software components, firmware components, peripheral device components, user input device components, information received from one or more user input devices, information stored in the at least one memory device 1016, etc.

In certain embodiments, the peripheral devices 1022 include several device interfaces, such as: (1) at least one output device 1020 including at least one display device 1035; (2) at least one input device 1030 (which may include contact and/or non-contact interfaces); (3) at least one transponder 1054; (4) at least one wireless communication component 1056; (5) at least one wired/wireless power distribution component 1058; (6) at least one sensor 1060; (7) at least one data preservation component 1062; (8) at least one motion/gesture analysis and interpretation component 1064; (9) at least one motion detection component 1066; (10) at least one portable power source 1068; (11) at least one geolocation module 1076; (12) at least one user identification module 1077; (13) at least one user/device tracking module 1078; and (14) at least one information filtering module 1079.

The at least one output device 1020 includes at least one display device 1035 configured to display any game(s) displayed by the EGM and any suitable information associated with such game(s). In certain embodiments, the display devices are connected to or mounted on a housing of the EGM (described below). In various embodiments, the display devices serve as digital glass configured to advertise certain games or other aspects of the gaming establishment in which the EGM is located. In various embodiments, the EGM includes one or more of the following display devices: (a) a central display device; (b) a player tracking display configured to display various information regarding a user's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM 2000*a* illustrated in FIG. 4A includes a central display device 2116, a player tracking display 2140, a credit display 2120, and a bet display 2122. The example EGM 2000*b* illustrated in FIG. 4B includes a central display device 2116, an upper display device 2118, a player tracking display 2140, a credit display 2120, and a bet display 2122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, the at least one output device 1020 includes a payout device. In these embodiments, after the EGM receives an actuation of a cashout device (described below), the EGM causes the payout device to provide a payment to the user. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. The example EGMs 2000*a* and 2000*b* illustrated in FIGS. 4A and 4B each include a ticket printer and dispenser 2136.

In certain embodiments, rather than dispensing bills, coins, or a physical ticket having a monetary value to the user following receipt of an actuation of the cashout device, the payout device is configured to cause a payment to be provided to the user in the form of an electronic funds transfer, such as via a direct deposit into a bank account, a casino account, or a prepaid account of the user; via a transfer of funds onto an electronically recordable identification card or smart card of the user; or via sending a virtual ticket having a monetary value to an electronic device of the user.

While any credit balances, any wagers, any values, and any awards are described herein as amounts of monetary credits or currency, one or more of such credit balances, such wagers, such values, and such awards may be for non-monetary credits, promotional credits, of player tracking points or credits.

In certain embodiments, the at least one output device 1020 is a sound generating device controlled by one or more sound cards. In one such embodiment, the sound generating device includes one or more speakers or other sound generating hardware and/or software configured to generate sounds, such as by playing music for any games or by playing music for other modes of the EGM, such as an attract mode. The example EGMs 2000*a* and 2000*b* illustrated in FIGS. 4A and 4B each include a plurality of speakers 2150. In another such embodiment, the EGM provides dynamic sounds coupled with attractive multimedia images displayed on one or more of the display devices to provide an audio-visual representation or to otherwise display full-motion video with sound to attract users to the EGM. In certain embodiments, the EGM displays a sequence of audio and/or visual attraction messages during idle periods to attract potential users to the EGM. The videos may be customized to provide any appropriate information.

The at least one input device 1030 may include any suitable device that enables an input signal to be produced and received by the at least one processor 1010 of the EGM.

In one embodiment, the at least one input device 1030 includes a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a user identification card reader into which a user identification card is inserted to fund the EGM; or (f) any suitable combination thereof. The example EGMs 2000*a* and 2000*b* illustrated in FIGS. 4A and 4B each include a combined bill and ticket acceptor 2128 and a coin slot 2126.

In one embodiment, the at least one input device 1030 includes a payment device configured to enable the EGM to be funded via an electronic funds transfer, such as a transfer of funds from a bank account. In another embodiment, the EGM includes a payment device configured to communicate with a mobile device of a user, such as a mobile phone, a radio frequency identification tag, or any other suitable wired or wireless device, to retrieve relevant information associated with that user to fund the EGM. When the EGM is funded, the at least one processor determines the amount of funds entered and displays the corresponding amount on a credit display or any other suitable display as described below.

In certain embodiments, the at least one input device 1030 includes at least one wagering or betting device. In various embodiments, the one or more wagering or betting devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). One such wagering or betting device is as a maximum wager or bet device that, when actuated, causes the EGM to place a maximum wager on a play of a game. Another such wagering or betting device is a repeat bet device that, when actuated, causes the EGM to place a wager that is equal to the previously-placed wager on a play of a game. A further such wagering or betting device is a bet one device that, when actuated, causes the EGM to increase the wager by one credit. Generally, upon actuation of one of the wagering or betting devices, the quantity of credits displayed in a credit meter (described below) decreases by the amount of credits wagered, while the quantity of credits displayed in a bet display (described below) increases by the amount of credits wagered.

In various embodiments, the at least one input device 1030 includes at least one game play activation device. In various embodiments, the one or more game play initiation devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). After a user appropriately funds the EGM and places a wager, the EGM activates the game play activation device to enable the user to actuate the game play activation device to initiate a play of a game on the EGM (or another suitable sequence of events associated with the EGM). After the EGM receives an actuation of the game play activation device, the EGM initiates the play of the game. The example EGMs 2000*a* and 2000*b* illustrated in FIGS. 4A and 4B each include a game play activation device in the form of a game play initiation button 2132. In other embodiments, the EGM begins game play automatically upon appropriate funding rather than upon utilization of the game play activation device.

In other embodiments, the at least one input device 1030 includes a cashout device. In various embodiments, the cashout device is: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). When the EGM receives an actuation of the cashout device from a user and the user has a positive (i.e., greater-than-zero) credit balance, the EGM initiates a payout associated with the user's credit balance. The example EGMs 2000*a* and 2000*b* illustrated in FIGS. 4A and 4B each include a cashout device in the form of a cashout button 2134.

In various embodiments, the at least one input device 1030 includes a plurality of buttons that are programmable by the EGM operator to, when actuated, cause the EGM to perform particular functions. For instance, such buttons may be hard keys, programmable soft keys, or icons icon displayed on a display device of the EGM (described below) that are actuatable via a touch screen of the EGM (described below) or via use of a suitable input device of the EGM (such as a mouse or a joystick). The example EGMs 2000*a* and 2000*b* illustrated in FIGS. 4A and 4B each include a plurality of such buttons 2130.

In certain embodiments, the at least one input device 1030 includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In embodiments including a player tracking system, as further described below, the at least one input device 1030 includes a card reader in communication with the at least one processor of the EGM. The example EGMs 2000*a* and 2000*b* illustrated in FIGS. 4A and 4B each include a card reader 2138. The card reader is configured to read a user identification card inserted into the card reader.

The at least one wireless communication component 1056 includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 1056 transmits electrical, electromagnetic, or optical signals that carry digital data streams or analog signals representing various types of information.

The at least one wired/wireless power distribution component 1058 includes components or devices that are configured to provide power to other devices. For example, in one embodiment, the at least one power distribution component 1058 includes a magnetic induction system that is configured to provide wireless power to one or more user input devices near the EGM. In one embodiment, a user input device docking region is provided, and includes a power distribution component that is configured to recharge a user input device without requiring metal-to-metal contact. In one embodiment, the at least one power distribution component 1058 is configured to distribute power to one or more internal components of the EGM, such as one or more rechargeable power sources (e.g., rechargeable batteries) located at the EGM.

In certain embodiments, the at least one sensor 1060 includes at least one of: optical sensors, pressure sensors, RF sensors, infrared sensors, image sensors, thermal sensors, and biometric sensors. The at least one sensor 1060 may be used for a variety of functions, such as: detecting movements and/or gestures of various objects within a predetermined proximity to the EGM; detecting the presence and/or identity of various persons (e.g., users, casino employees, etc.), devices (e.g., user input devices), and/or systems within a predetermined proximity to the EGM.

The at least one data preservation component 1062 is configured to detect or sense one or more events and/or conditions that, for example, may result in damage to the EGM and/or that may result in loss of information associated with the EGM. Additionally, the data preservation system 1062 may be operable to initiate one or more appropriate action(s) in response to the detection of such events/conditions.

The at least one motion/gesture analysis and interpretation component 1064 is configured to analyze and/or interpret information relating to detected user movements and/or gestures to determine appropriate user input information relating to the detected user movements and/or gestures. For example, in one embodiment, the at least one motion/gesture analysis and interpretation component 1064 is configured to perform one or more of the following functions: analyze the detected gross motion or gestures of a user; interpret the user's motion or gestures (e.g., in the context of a casino game being played) to identify instructions or input from the user; utilize the interpreted instructions/input to advance the game state; etc. In other embodiments, at least a portion of these additional functions may be implemented at a remote system or device.

The at least one portable power source 1068 enables the EGM to operate in a mobile environment. For example, in one embodiment, the EGM 300 includes one or more rechargeable batteries.

The at least one geolocation module 1076 is configured to acquire geolocation information from one or more remote sources and use the acquired geolocation information to determine information relating to a relative and/or absolute position of the EGM. For example, in one implementation, the at least one geolocation module 1076 is configured to receive GPS signal information for use in determining the position or location of the EGM. In another implementation, the at least one geolocation module 1076 is configured to receive multiple wireless signals from multiple remote devices (e.g., EGMs, servers, wireless access points, etc.) and use the signal information to compute position/location information relating to the position or location of the EGM.

The at least one user identification module 1077 is configured to determine the identity of the current user or current owner of the EGM. For example, in one embodiment, the current user is required to perform a login process at the EGM in order to access one or more features. Alternatively, the EGM is configured to automatically determine the identity of the current user based on one or more external signals, such as an RFID tag or badge worn by the current user and that provides a wireless signal to the EGM that is used to determine the identity of the current user. In at least one embodiment, various security features are incorporated into the EGM to prevent unauthorized users from accessing confidential or sensitive information.

The at least one information filtering module 1079 is configured to perform filtering (e.g., based on specified criteria) of selected information to be displayed at one or more displays 1035 of the EGM.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumb sticks, ticket readers, touch screens, trackballs, touchpads, wheels, and wireless communication devices.

As generally described above, in certain embodiments, such as the example EGMs 2000*a* and 2000*b* illustrated in FIGS. 4A and 4B, the EGM has a support structure, housing, or cabinet that provides support for a plurality of the input devices and the output devices of the EGM. Further, the EGM is configured such that a user may operate it while standing or sitting. In various embodiments, the EGM is positioned on a base or stand, or is configured as a pub-style tabletop game (not shown) that a user may operate typically while sitting. As illustrated by the different example EGMs 2000*a* and 2000*b* shown in FIGS. 4A and 4B, EGMs may have varying housing and display configurations.

In certain embodiments, the EGM is a device that has obtained approval from a regulatory gaming commission, and in other embodiments, the EGM is a device that has not obtained approval from a regulatory gaming commission.

The EGMs described above are merely three examples of different types of EGMs. Certain of these example EGMs may include one or more elements that may not be included in all gaming systems, and these example EGMs may not include one or more elements that are included in other gaming systems. For example, certain EGMs include a coin acceptor while others do not.

In various embodiments, an EGM may be implemented in one of a variety of different configurations. In various embodiments, the EGM may be implemented as one of: (a) a dedicated EGM in which computerized game programs executable by the EGM for controlling any primary or base games (referred to herein as "primary games") and/or any secondary or bonus games or other functions (referred to herein as "secondary games") displayed by the EGM are provided with the EGM before delivery to a gaming establishment or before being provided to a user; and (b) a changeable EGM in which computerized game programs executable by the EGM for controlling any primary games and/or secondary games displayed by the EGM are downloadable or otherwise transferred to the EGM through a data network or remote communication link; from a USB drive, flash memory card, or other suitable memory device; or in any other suitable manner after the EGM is physically located in a gaming establishment or after the EGM is provided to a user.

As generally explained above, in various embodiments in which the gaming system includes a server and a changeable EGM, the at least one memory device of the server stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the server is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the server to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards.

In certain embodiments in which the gaming system includes a server and an EGM, the EGM is configured to communicate with the server for monitoring purposes only. In such embodiments, the EGM determines the game outcome(s) and/or award(s) to be provided in any of the manners described above, and the server monitors the activities and events occurring on the EGM. In one such embodiment, the gaming system includes a real-time or online accounting and gaming information system configured to communicate with the server. In this embodiment, the accounting and gaming information system includes: (a) a user database configured to store user profiles, (b) a player tracking module configured to track users (as described below), and (c) a credit system configured to provide automated transactions.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electromechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award.

As generally noted above, in addition to providing winning credits or other awards for one or more plays of the primary game(s), in various embodiments the gaming system provides credits or other awards for one or more plays of one or more secondary games. The secondary game typically enables an award to be obtained addition to any award obtained through play of the primary game(s). The secondary game(s) typically produces a higher level of user excitement than the primary game(s) because the secondary game(s) provides a greater expectation of winning than the primary game(s) and is accompanied with more attractive or unusual features than the primary game(s). The secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. Any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for providing the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable users of those EGMs to work in conjunction with one another, such as by enabling the users to play together as a team or group, to win one or more awards. In other such embodiments, the EGMs enable users of those EGMs to compete against one another for one or more awards. In one such embodiment, the EGMs enable the users of those EGMs to participate in one or more gaming tournaments for one or more awards.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a user's gaming activity. In one such embodiment, the player tracking system does so through the use of player tracking cards. In this embodiment, a user is issued a user identification card that has an encoded user identification number that uniquely identifies the user. When the user's playing tracking card is inserted into a card reader of the gaming system to begin a gaming session, the card reader reads the user identification number off the player tracking card to identify the user. The gaming system timely tracks any suitable information or data relating to the identified user's gaming session. The gaming system also timely tracks when the player tracking card is removed to conclude play for that gaming session. In another embodiment, rather than requiring insertion of a player tracking card into the card reader, the gaming system utilizes one or more portable devices, such as a mobile phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more users, the player tracking system includes the user's account number, the user's card number, the user's first name, the user's surname, the user's preferred name, the user's player tracking ranking, any promotion status associated with the user's player tracking card, the user's address, the user's birthday, the user's anniversary, the user's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device.

In various embodiments, the gaming system includes one or more servers configured to communicate with a personal gaming device—such as a smartphone, a tablet computer, a desktop computer, or a laptop computer—to enable web-based game play using the personal gaming device. In various embodiments, the user must first access a gaming website via an Internet browser of the personal gaming device or execute an application (commonly called an "app") installed on the personal gaming device before the user can use the personal gaming device to participate in web-based game play. In certain embodiments, the one or more servers and the personal gaming device operate in a thin-client environment. In these embodiments, the personal gaming device receives inputs via one or more input devices (such as a touch screen and/or physical buttons), the personal gaming device sends the received inputs to the one or more servers, the one or more servers make various determinations based on the inputs and determine content to be displayed (such as a randomly determined game outcome and corresponding award), the one or more servers send the content to the personal gaming device, and the personal gaming device displays the content.

In certain such embodiments, the one or more servers must identify the user before enabling game play on the personal gaming device (or, in some embodiments, before enabling monetary wager-based game play on the personal gaming device). In these embodiments, the user must identify herself to the one or more servers, such as by inputting the user's unique username and password combination, providing an input to a biometric sensor (e.g., a fingerprint sensor, a retinal sensor, a voice sensor, or a facial-recognition sensor), or providing any other suitable information.

Once identified, the one or more servers enable the user to establish an account balance from which the user can draw credits usable to wager on plays of a game. In certain embodiments, the one or more servers enable the user to initiate an electronic funds transfer to transfer funds from a bank account to the user's account balance. In other embodiments, the one or more servers enable the user to make a payment using the user's credit card, debit card, or other suitable device to add money to the user's account balance. In other embodiments, the one or more servers enable the user to add money to the user's account balance via a peer-to-peer type application, such as PayPal or Venmo. The one or more servers also enable the user to cash out the user's account balance (or part of it) in any suitable manner, such as via an electronic funds transfer, by initiating creation of a paper check that is mailed to the user, or by initiating printing of a voucher at a kiosk in a gaming establishment.

In certain embodiments, the one or more servers include a payment server that handles establishing and cashing out users' account balances and a separate game server configured to determine the outcome and any associated award for a play of a game. In these embodiments, the game server is configured to communicate with the personal gaming device and the payment device, and the personal gaming device and the payment device are not configured to directly communicate with one another. In these embodiments, when the game server receives data representing a request to start a play of a game at a desired wager, the game server sends data representing the desired wager to the payment server. The payment server determines whether the user's account balance can cover the desired wager (i.e., includes a monetary balance at least equal to the desired wager).

If the payment server determines that the user's account balance cannot cover the desired wager, the payment server notifies the game server, which then instructs the personal gaming device to display a suitable notification to the user that the user's account balance is too low to place the desired wager. If the payment server determines that the user's account balance can cover the desired wager, the payment server deducts the desired wager from the account balance and notifies the game server. The game server then determines an outcome and any associated award for the play of the game. The game server notifies the payment server of any nonzero award, and the payment server increases the user's account balance by the nonzero award. The game server sends data representing the outcome and any award to the personal gaming device, which displays the outcome and any award.

In certain embodiments, the one or more servers enable web-based game play using a personal gaming device only if the personal gaming device satisfies one or more jurisdictional requirements. In one embodiment, the one or more servers enable web-based game play using the personal gaming device only if the personal gaming device is located within a designated geographic area (such as within certain state or county lines or within the boundaries of a gaming establishment). In this embodiment, the geolocation module of the personal gaming device determines the location of the personal gaming device and sends the location to the one or more servers, which determine whether the personal gaming device is located within the designated geographic area. In various embodiments, the one or more servers enable non-monetary wager-based game play if the personal gaming device is located outside of the designated geographic area.

In various embodiments, the gaming system includes an EGM configured to communicate with a personal gaming device—such as a smartphone, a tablet computer, a desktop computer, or a laptop computer—to enable tethered mobile game play using the personal gaming device. Generally, in these embodiments, the EGM establishes communication with the personal gaming device and enables the user to play games on the EGM remotely via the personal gaming device. In certain embodiments, the gaming system includes a geo-fence system that enables tethered game play within a particular geographic area but not outside of that geographic area.

In certain embodiments, the gaming system is configured to communicate with a social network server that hosts or partially hosts a social networking website via a data network (such as the Internet) to integrate a user's gaming experience with the user's social networking account. This enables the gaming system to send certain information to the social network server that the social network server can use to create content (such as text, an image, and/or a video) and post it to the user's wall, newsfeed, or similar area of the social networking website accessible by the user's connections (and in certain cases the public) such that the user's connections can view that information. This also enables the gaming system to receive certain information from the social network server, such as the user's likes or dislikes or the user's list of connections. In certain embodiments, the gaming system enables the user to link the user's user account to the user's social networking account(s). This enables the gaming system to, once it identifies the user and initiates a gaming session (such as via the user logging in to a website (or an application) on the user's personal gaming device or via the user inserting the user's player tracking card into an EGM), link that gaming session to the user's social networking account(s). In other embodiments, the gaming system enables the user to link the user's social networking account(s) to individual gaming sessions when desired by providing the required login information.

For instance, in one embodiment, if a user wins a particular award (e.g., a progressive award or a jackpot award) or an award that exceeds a certain threshold (e.g., an award exceeding $1,000), the gaming system sends information about the award to the social network server to enable the server to create associated content (such as a screenshot of the outcome and associated award) and to post that content to the user's wall (or other suitable area) of the social networking website for the user's connections to see (and to entice them to play). In another embodiment, if a user joins a multiuser game and there is another seat available, the gaming system sends that information to the social network sever to enable the server to create associated content (such as text indicating a vacancy for that particular game) and to post that content to the user's wall (or other suitable area) of the social networking website for the user's connections to see (and to entice them to fill the vacancy). In another embodiment, if the user consents, the gaming system sends advertisement information or offer information to the social network server to enable the social network server to create associated content (such as text or an image reflecting an advertisement and/or an offer) and to post that content to the user's wall (or other suitable area) of the social networking website for the user's connections to see. In another embodiment, the gaming system enables the user to recommend a game to the user's connections by posting a recommendation to the user's wall (or other suitable area) of the social networking web site.

Certain of the gaming systems described herein, such as EGMs located in a casino or another gaming establishment, include certain components and/or are configured to operate in certain manners that differentiate these systems from general purpose computing devices, i.e., certain personal gaming devices such as desktop computers and laptop computers.

For instance, EGMs are highly regulated to ensure fairness and, in many cases, EGMs are configured to award monetary awards up to multiple millions of dollars. To satisfy security and regulatory requirements in a gaming environment, hardware and/or software architectures are implemented in EGMs that differ significantly from those of general purpose computing devices. For purposes of illustration, a description of EGMs relative to general purpose computing devices and some examples of these additional (or different) hardware and/or software architectures found in EGMs are described below.

At first glance, one might think that adapting general purpose computing device technologies to the gaming industry and EGMs would be a simple proposition because both general purpose computing devices and EGMs employ processors that control a variety of devices. However, due to at least: (1) the regulatory requirements placed on EGMs, (2) the harsh environment in which EGMs operate, (3) security requirements, and (4) fault tolerance requirements, adapting general purpose computing device technologies to EGMs can be quite difficult. Further, techniques and methods for solving a problem in the general purpose computing device industry, such as device compatibility and connectivity issues, might not be adequate in the gaming industry. For instance, a fault or a weakness tolerated in a general purpose computing device, such as security holes in software or frequent crashes, is not tolerated in an EGM because in an EGM these faults can lead to a direct loss of funds from the EGM, such as stolen cash or loss of revenue when the EGM is not operating properly or when the random outcome determination is manipulated.

Certain differences between general purpose computing devices and EGMs are described below. A first difference between EGMs and general purpose computing devices is that EGMs are state-based systems. A state-based system stores and maintains its current state in a non-volatile memory such that, in the event of a power failure or other malfunction, the state-based system can return to that state when the power is restored or the malfunction is remedied. For instance, for a state-based EGM, if the EGM displays an award for a game of chance but the power to the EGM fails before the EGM provides the award to the user, the EGM stores the pre-power failure state in a non-volatile memory, returns to that state upon restoration of power, and provides the award to the user. This requirement affects the software and hardware design on EGMs. General purpose computing devices are not state-based machines, and a majority of data is usually lost when a malfunction occurs on a general purpose computing device.

A second difference between EGMs and general purpose computing devices is that, for regulatory purposes, the software on the EGM utilized to operate the EGM has been designed to be static and monolithic to prevent cheating by the operator of the EGM. For instance, one solution that has been employed in the gaming industry to prevent cheating and to satisfy regulatory requirements has been to manufacture an EGM that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the EGM in the presence of a gaming regulator. Regardless of whether the EPROM solution is used, to gain approval in most gaming jurisdictions, an EGM must demonstrate sufficient safeguards that prevent an operator or a user of an EGM from manipulating the EGM's hardware and software in a manner that gives him an unfair, and in some cases illegal, advantage.

A third difference between EGMs and general purpose computing devices is authentication—EGMs storing code are configured to authenticate the code to determine if the code is unaltered before executing the code. If the code has been altered, the EGM prevents the code from being executed. The code authentication requirements in the gaming industry affect both hardware and software designs on EGMs. Certain EGMs use hash functions to authenticate code. For instance, one EGM stores game program code, a hash function, and an authentication hash (which may be encrypted). Before executing the game program code, the EGM hashes the game program code using the hash function to obtain a result hash and compares the result hash to the authentication hash. If the result hash matches the authentication hash, the EGM determines that the game program code is valid and executes the game program code. If the result hash does not match the authentication hash, the EGM determines that the game program code has been altered (i.e., may have been tampered with) and prevents execution of the game program code.

A fourth difference between EGMs and general purpose computing devices is that EGMs have unique peripheral device requirements that differ from those of a general purpose computing device, such as peripheral device security requirements not usually addressed by general purpose computing devices. For instance, monetary devices, such as coin dispensers, bill validators, and ticket printers and computing devices that are used to govern the input and output of cash or other items having monetary value (such as tickets) to and from an EGM have security requirements that are not typically addressed in general purpose computing devices. Therefore, many general purpose computing device techniques and methods developed to facilitate device connectivity and device compatibility do not address the emphasis placed on security in the gaming industry.

To address some of the issues described above, a number of hardware/software components and architectures are utilized in EGMs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain EGMs use a watchdog timer to provide a software failure detection mechanism. In a normally-operating EGM, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain EGMs use several power supply voltages to operate portions of the computer circuitry. These can be generated in a central power supply or locally on the computer board. If any of these voltages falls out of the tolerance limits of the circuitry they power, unpredictable operation of the EGM may result. Though most modern general purpose computing devices include voltage monitoring circuitry, these types of circuits only report voltage status to the operating software. Out of tolerance voltages can cause software malfunction, creating a potential uncontrolled condition in the general purpose computing device. Certain EGMs have power supplies with relatively tighter voltage margins than that required by the operating circuitry. In addition, the voltage monitoring circuitry implemented in certain EGMs typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the EGM.

As described above, certain EGMs are state-based machines. Different functions of the game provided by the EGM (e.g., bet, play, result, points in the graphical presentation, etc.) may be defined as a state. When the EGM moves a game from one state to another, the EGM stores critical data regarding the game software in a custom non-volatile memory subsystem. This ensures that the user's wager and credits are preserved and to minimize potential disputes in the event of a malfunction on the EGM. In general, the EGM does not advance from a first state to a second state until critical information that enables the first state to be reconstructed has been stored. This feature enables the EGM to recover operation to the current state of play in the event of a malfunction, loss of power, etc. that occurred just before the malfunction. In at least one embodiment, the EGM is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the EGM memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as "fault-tolerant" memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve EGM critical data, although other types of non-volatile memory devices may be employed. These memory devices are typically not used in typical general purpose computing devices.

Thus, in at least one embodiment, the EGM is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of EGM critical information) within a time period of 200 milliseconds or less. In at least one embodiment, the time period of 200 milliseconds represents a maximum amount of time for which sufficient power may be available to the various EGM components after a power outage event has occurred at the EGM.

As described previously, the EGM may not advance from a first state to a second state until critical information that enables the first state to be reconstructed has been atomically stored. After the state of the EGM is restored during the play of a game of chance, game play may resume and the game may be completed in a manner that is no different than if the malfunction had not occurred. Thus, for example, when a malfunction occurs during a game of chance, the EGM may be restored to a state in the game of chance just before when the malfunction occurred. The restored state may include metering information and graphical information that was displayed on the EGM in the state before the malfunction. For example, when the malfunction occurs during the play of a card game after the cards have been dealt, the EGM may be restored with the cards that were previously displayed as part of the card game. As another example, a bonus game may be triggered during the play of a game of chance in which a user is required to make a number of selections on a video display screen. When a malfunction has occurred after the user has made one or more selections, the EGM may be restored to a state that shows the graphical presentation just before the malfunction including an indication of selections that have already been made by the user. In general, the EGM may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device. The information stored in the non-volatile memory may be detailed enough to reconstruct a portion of the graphical presentation that was previously presented on the EGM and the state of the EGM (e.g., credits) at the time the game of chance was played. The game history information may be utilized in the event of a dispute. For example, a user may decide that in a previous game of chance that they did not receive credit for an award that they believed they won. The game history information may be used to reconstruct the state of the EGM before, during, and/or after the disputed game to demonstrate whether the user was correct or not in the user's assertion.

Another feature of EGMs is that they often include unique interfaces, including serial interfaces, to connect to specific subsystems internal and external to the EGM. The serial devices may have electrical interface requirements that differ from the "standard" EIA serial interfaces provided by general purpose computing devices. These interfaces may include, for example, Fiber Optic Serial, optically coupled serial interfaces, current loop style serial interfaces, etc. In addition, to conserve serial interfaces internally in the EGM, serial devices may be connected in a shared, daisy-chain fashion in which multiple peripheral devices are connected to a single serial channel.

The serial interfaces may be used to transmit information using communication protocols that are unique to the gaming industry. For example, IGT's Netplex is a proprietary communication protocol used for serial communication between EGMs. As another example, SAS is a communication protocol used to transmit information, such as metering information, from an EGM to a remote device. Often SAS is used in conjunction with a player tracking system.

Certain EGMs may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into an EGM by monitoring security switches attached to access doors in the EGM cabinet. Access violations result in suspension of game play and can trigger additional security operations to preserve the current state of game play. These circuits also function when power is off by use of a battery backup. In power-off operation, these circuits continue to monitor the access doors of the EGM. When power is restored, the EGM can determine whether any security violations occurred while power was off, e.g., via software for reading status registers. This can trigger event log entries and further data authentication operations by the EGM software.

Trusted memory devices and/or trusted memory sources are included in an EGM to ensure the authenticity of the software that may be stored on less secure memory subsystems, such as mass storage devices. Trusted memory devices and controlling circuitry are typically designed to not enable modification of the code and data stored in the memory device while the memory device is installed in the EGM. The code and data stored in these devices may include authentication algorithms, random number generators, authentication keys, operating system kernels, etc. The purpose of these trusted memory devices is to provide gaming regulatory authorities a root trusted authority within the computing environment of the EGM that can be tracked and verified as original. This may be accomplished via removal of the trusted memory device from the EGM computer and verification of the secure memory device contents is a separate third party verification device. Once the trusted memory device is verified as authentic, and based on the approval of the verification algorithms included in the trusted device, the EGM is enabled to verify the authenticity of additional code and data that may be located in the gaming computer assembly, such as code and data stored on hard disk drives.

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

Mass storage devices used in a general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, EGMs that include mass storage devices include hardware level mass storage data protection circuitry that operates at the circuit level to monitor attempts to modify data on the mass storage device and will generate both software and hardware error triggers should a data modification be attempted without the proper electronic and physical enablers being present.

It should be appreciated that the terminology used herein is for the purpose of describing particular aspects only and is not intended to be limiting of the disclosure. For example, the singular forms "a", "an" and "the" are intended to include the plural forms as well, unless the context clearly indicates otherwise. In another example, the terms "including" and "comprising" and variations thereof, when used in this specification, specify the presence of stated features, steps, operations, elements, and/or components, but do not preclude the presence or addition of one or more other features, steps, operations, elements, components, and/or groups thereof. Additionally, a listing of items does not imply that any or all of the items are mutually exclusive nor does a listing of items imply that any or all of the items are collectively exhaustive of anything or in a particular order, unless expressly specified otherwise. Moreover, as used herein, the term "and/or" includes any and all combinations of one or more of the associated listed items. It should be further appreciated that headings of sections provided in this document and the title are for convenience only, and are not to be taken as limiting the disclosure in any way. Furthermore, unless expressly specified otherwise, devices that are in communication with each other need not be in continuous communication with each other and may communicate directly or indirectly through one or more intermediaries.

Various changes and modifications to the present embodiments described herein will be apparent to those skilled in the art. For example, a description of an embodiment with several components in communication with each other does not imply that all such components are required, or that each of the disclosed components must communicate with every other component. On the contrary a variety of optional components are described to illustrate the wide variety of possible embodiments of the present disclosure. As such, these changes and modifications can be made without departing from the spirit and scope of the present subject matter and without diminishing its intended technical scope. It is therefore intended that such changes and modifications be covered by the appended claims.

The invention is claimed as follows:

1. An electronic gaming machine comprising:
- a housing comprising an access door;
- a security monitoring circuit supported by the housing;
- a processor; and
- a memory device that stores a plurality of instructions that, when executed by the processor in association with an activation, cause the processor to:
  - determine an outcome for the activation,
  - cause a display, by a display device, of the outcome, and
  - responsive to the outcome being associated with an occurrence of a point accumulation event:
    - determine a quantity of points,
    - accumulate the quantity of points,
    - when an opening of the access door is detected via the security monitoring circuit following the accumulation of the quantity of points and prior to any triggering of any secondary event associated with the accumulated quantity of points:
      - store data associated with a state of the electronic gaming machine prior to the detection of the opening of the access door, the data comprising the accumulated quantity of points,
      - disable any triggering of any secondary event associated with the accumulated quantity of points, and
      - following a closing of the access door detected via the security monitoring circuit:
        - load the stored data associated with the state of the electronic gaming machine prior to the detection of the opening of the access door, and
        - enable a triggering of a secondary event associated with the accumulated quantity of points, and
    - responsive to the accumulated quantity of points causing a total quantity of points accumulated over a plurality of activations to reach a threshold quantity of points, trigger the secondary event comprising an opportunity to obtain a designated result, wherein a probability of obtaining the designated result in association with the triggering of the secondary event is less than 100% and independent of any accumulation of any points.

2. The electronic gaming machine of claim 1, wherein the determination of the quantity of points is based on the determined outcome.

3. The electronic gaming machine of claim 2, wherein a first outcome is associated with a first quantity of points and a second, different outcome is associated with a second, different quantity of points.

4. The electronic gaming machine of claim 1, wherein the determination of the quantity of points is based on an element of the outcome.

5. The electronic gaming machine of claim 4, wherein a first element is associated with a first quantity of points and a second, different element is associated with a second, different quantity of points.

6. The electronic gaming machine of claim 1, wherein the memory device stores a plurality of further instructions that, when executed by the processor responsive to the accumulated quantity of points not causing the total quantity of points accumulated over the plurality of activations to reach the threshold quantity of points, cause the processor to retain the accumulated quantity of points for another activation.

7. The electronic gaming machine of claim 1, wherein the memory device stores a plurality of further instructions that, when executed by the processor responsive to the accumulated quantity of points causing the total quantity of points accumulated over the plurality of activations to reach the threshold quantity of points, cause the processor to reset the total quantity of points accumulated over the plurality of activations for another activation.

8. The electronic gaming machine of claim 1, wherein the memory device stores a plurality of further instructions that, when executed by the processor, cause the processor to randomly determine the threshold quantity of points.

9. The electronic gaming machine of claim 1, wherein the memory device stores a plurality of further instructions that, when executed by the processor, cause the processor to cause a display, by the display device, of a non-numerical indication of the total quantity of points accumulated over the plurality of activations.

10. The electronic gaming machine of claim 1, wherein the memory device stores a plurality of further instructions that, when executed by the processor, cause the processor to cause a display, by the display device, of a non-numerical indication of the total quantity of points accumulated over the plurality of activations relative to the threshold quantity of points.

11. An electronic gaming machine comprising:
a housing comprising an access door;
a security monitoring circuit supported by the housing;
a processor; and
a memory device that stores a plurality of instructions that, when executed by the processor, cause the processor to:
responsive to a secondary event being triggered in association with an activation comprising a first quantity of at least two sets of elements:
cause a display, by a display device, of a first quantity of selection groups, wherein each selection group of the first quantity of selection groups comprises a plurality of selections and the first quantity of selection groups corresponds to the first quantity of at least two sets of elements,
when an opening of the access door is detected via the security monitoring circuit following the display of the first quantity of selection groups and prior to any pick of the first quantity of selection groups:
store data associated with a display state of the electronic gaming machine prior to the detection of the opening of the access door, the data comprising the first quantity of selection groups and the plurality of selections of each selection group of the first quantity of selection groups,
disable any picks of any selection group of the first quantity of selection groups, and
following a closing of the access door detected via the security monitoring circuit:
load the stored data to reconstitute the stored display state of the electronic gaming machine, and
enable any picks of any selection group of the first quantity of selection groups, and
receive a single pick of a selection group of the first quantity of selection groups, and
after receiving the single pick of the selection group of the first quantity of selection groups and without receiving any individual picks for any of the plurality of selections of the picked selection group of the first quantity of selection groups, for each selection of the plurality of selections of the picked selection group of the first quantity of selection groups:
determine a designated result associated with that selection, and
cause a display, by the display device, of the designated result associated with that selection; and
responsive to the secondary event being triggered in association with the activation comprising a second, different quantity of at least two sets of elements:
cause a display, by the display device, of a second, different quantity of selection groups, wherein each selection group of the second, different quantity of selection groups comprises the plurality of selections and the second, different quantity of selection groups corresponds to the second, different quantity of at least two sets of elements,
receive a single pick of a selection group of the second, different quantity of selection groups, and
after receiving the single pick of the selection group of the second, different quantity of selection groups and without receiving any individual picks for any of the plurality of selections of the picked selection group of the second, different quantity of selection groups, for each selection of the plurality of selections of the picked selection group of the second, different quantity of selection groups:
determine a designated result associated with that selection, and
cause a display, by the display device, of the designated result associated with that selection.

12. The electronic gaming machine of claim 11, wherein the secondary event is triggered in association with the activation responsive to an accumulation of a quantity of points causing a total quantity of accumulated points to reach a threshold quantity of points.

13. The electronic gaming machine of claim 12, wherein the accumulation of the quantity of points is based on a result of the activation.

14. The electronic gaming machine of claim 13, wherein the memory device stores a plurality of further instructions that, when executed by the processor responsive to the accumulation of the quantity of points not causing the total quantity of accumulated points to reach the threshold quantity of points, cause the processor to retain the quantity of points.

15. The electronic gaming machine of claim 12, wherein the memory device stores a plurality of further instructions that, when executed by the processor, cause the processor to cause a display, by the display device, of any of: a non-numerical indication of the total quantity of accumulated points, and a non-numerical indication of the total quantity of accumulated points relative to the threshold quantity of points.

16. The electronic gaming machine of claim 11, wherein the first quantity of at least two sets of elements comprises a first quantity of designated sets of elements and the second, different quantity of at least two sets of elements comprises a second, different quantity of designated sets of elements.

17. An electronic gaming machine comprising:
a housing comprising an access door;
a security monitoring circuit supported by the housing;
a processor; and
a memory device that stores a plurality of instructions that, when executed by the processor, cause the processor to:
responsive to a first secondary event being triggered in association with a first activation comprising a first quantity of sets of elements, determine, based on the first quantity of elements, a first quantity of picks of a plurality of selection groups, wherein each pick results in a plurality of designated results associated with a plurality of selections of the picked selection group being displayed by a display device, when an opening of the access door is detected via the security monitoring circuit following the determination of the first quantity of picks of the plurality of selection groups:

store data associated with a state of the electronic gaming machine prior to the detection of the opening of the access door, the data comprising the first quantity of picks of the plurality of selection groups, disable any trigging of any second secondary event, and following a closing of the access door detected via the security monitoring circuit:

load the stored data associated with the state of the electronic gaming machine prior to the detection of the opening of the access door, and enable a trigging of a second secondary event, and responsive to the second secondary event being triggered in association with a second activation comprising a second, different quantity of sets of elements, determine, based on the second, different quantity of sets of elements, a second, different quantity of picks of the plurality of selection groups.

18. The electronic gaming machine of claim 17, wherein the first secondary event is triggered in association with the first activation responsive to an accumulation of a quantity of points causing a total quantity of accumulated points to reach a threshold quantity of points.

19. The electronic gaming machine of claim 18, wherein the accumulation of the quantity of points is based on a result of the first activation.

* * * * *